US006961060B1

(12) United States Patent (10) Patent No.: US 6,961,060 B1
Mochizuki et al. (45) Date of Patent: Nov. 1, 2005

(54) VIRTUAL SPACE CONTROL DATA RECEIVING APPARATUS, VIRTUAL SPACE CONTROL DATA TRANSMISSION AND RECEPTION SYSTEM, VIRTUAL SPACE CONTROL DATA RECEIVING METHOD, AND VIRTUAL SPACE CONTROL DATA RECEIVING PROGRAM STORAGE MEDIA

(75) Inventors: Yoshiyuki Mochizuki, Osaka (JP); Toshiya Naka, Osaka (JP); Shigeo Asahara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/526,483

(22) Filed: Mar. 15, 2000

(30) Foreign Application Priority Data

Mar. 16, 1999 (JP) ................................. 11-069747
Mar. 26, 1999 (JP) ................................. 11-083310

(51) Int. Cl.⁷ .......................................... G06T 15/00
(52) U.S. Cl. ...................... 345/473; 709/219; 463/42
(58) Field of Search ....................... 463/42; 345/473, 345/474, 475; 709/231, 219, 246

(56) References Cited

U.S. PATENT DOCUMENTS

| 5,288,993 | A | * | 2/1994 | Bidiville et al. ............ 250/221 |
| 5,793,356 | A | * | 8/1998 | Svancarek et al. .......... 345/161 |
| 5,835,693 | A | * | 11/1998 | Lynch et al. ................. 345/473 |
| 5,999,173 | A | * | 12/1999 | Ubillos ........................ 345/724 |
| 6,191,798 | B1 | * | 2/2001 | Handelman et al. ........ 345/473 |

FOREIGN PATENT DOCUMENTS

WO 9852356 * 11/1998 ............ H04N 7/12

OTHER PUBLICATIONS

Matsuba et al., "Bottom, Thou Art Translated": The Making of VRML Dream, Feb. 22, 1999 IEEE, pp. 45-52.*
Carson et al.. "Multicast Shared Virtual Worlds Using VRML97", VRML99, Feb. 23-26, 1999, VRML99, pp. 133-140.*
Naka et al., "A Compression/Decompression Method for Streaming Based Humanoid Animation", Feb. 23-26, 1999, VRML99, 63-70.*
Electronic Cafe International, "The Encounter", Jan. 19, 1998, pp. 1-3.*
Toshiya Naka et al., A Compression/Decompression Method for Streaming Based Humanoid Animation, VRML 99, pp. 63-70.

* cited by examiner

Primary Examiner—Phu K. Nguyen
(74) Attorney, Agent, or Firm—Wenderoth, Lind & Ponack, L.L.P.

(57) ABSTRACT

A virtual space control data receiving apparatus comprises stream data receiving means for receiving a plurality of stream data for controlling a dynamic virtual space, according to the type of each stream data; manual data input means for inputting control data for an object to be controlled in the virtual space; and control data output means for outputting the control data input by the manual data input means, for the object controlled by the manual data input means, and outputting the stream data received by the stream data receiving means, for the other objects. Therefore, in a dynamic virtual space represented by 3-dimensional CG, static image, dynamic image, audio, and text which are based on a network such as the Internet, the virtual space can be reproduced in real time, and the viewer can selectively control an object.

20 Claims, 14 Drawing Sheets

Fig.9 (a)

| | header section | data section |
|---|---|---|
| channel definition packet | • packet ID<br>• time stamp<br>• total number of channels(Tc)<br>• compression method ID<br>• packet size | • channel ID<br>• channel data size<br>• channel type<br>• channel data name<br><br>× total number of channels (Tc) |
| data packet (1block) | • packet ID<br>• time stamp<br>• total number of channels (Dc) | • channel ID<br>• channel data size × packet size<br><br>× packet size<br>× total number of channels (Dc) |

Fig.9 (b)

| channel definition packet | data packet (1block) | data packet (1block) | ····· | channel definition packet | data packet (1block) | ····· |
|---|---|---|---|---|---|---|

Fig.13 (a)

|  | header section | data section |
|---|---|---|
| control data packet (1 block) | · client ID<br>· packet ID<br>· time stamp<br>· total number of channels(Dc) | · channel ID<br>· channel data<br>× packet size<br><br>× total number of channels (Dc) |

Fig.13 (b)

| control data packet (1 block) | control data packet (1 block) | ..... | control data packet (1 block) | ..... |
|---|---|---|---|---|

Fig.13 (c)

|  | header section | data section |
|---|---|---|
| selection data packet | · client ID<br>· packet ID<br>· control target ID<br>· time stamp<br>· total number of channels(Tc)<br>· compression method ID<br>· packet size | · channel ID<br>· channel data size<br>· channel type<br>· channel data name<br><br>× total number of channels (Tc) |

Fig.13 (d)

| selection data packet | control data packet (1 block) | control data packet (1 block) | ..... | selection data packet | control data packet (1 block) | ..... |
|---|---|---|---|---|---|---|

VIRTUAL SPACE CONTROL DATA RECEIVING APPARATUS, VIRTUAL SPACE CONTROL DATA TRANSMISSION AND RECEPTION SYSTEM, VIRTUAL SPACE CONTROL DATA RECEIVING METHOD, AND VIRTUAL SPACE CONTROL DATA RECEIVING PROGRAM STORAGE MEDIA

FIELD OF THE INVENTION

The present invention relates to a virtual space control data receiving apparatus, a virtual space control data transmission and reception system, a virtual space control data receiving method, and a virtual space control data receiving program storage medium and, more particularly, to those for controlling a dynamic virtual space represented by three-dimensional computer graphics (hereinafter referred to as 3-dimensional CG), static image, dynamic image, audio, and text which are based on a network such as the Internet.

BACKGROUND OF THE INVENTION

In recent years, virtual malls, electronic commerce, and related home pages, such as WWW (World Wide Web) on the Internet, have attracted attention as utilization fields of 3-dimensional CG. Especially, the rapid progress of the Internet provides an environment in which relatively high definition 3-dimensional CG such as games and movies are easily handled at home. In the conventional WWW, a machine called a server, such as a personal computer or a work station, is connected through the Internet to plural machines called clients, such as personal computers. In this system, data such as video, audio, text, window layout, and the like are downloaded from the server in response to a request from a client, and the client reconstructs the downloaded data to obtain necessary information. A communication method based on TCP/IP (Transmission Control Protocol/Internet Protocol) is employed for the server-to-client communication.

In the conventional WWW, data supplied from the server were mainly text data and video data. In recent years, with standardization of VRML (Virtual Reality Modeling Language) and browsers for VRML, there is a movement on foot to transmit 3-dimensional CG itself, such as shape data and texture data constituting a scene.

Hereinafter, the VRML will be briefly described.

In the conventional data format mainly composed of video data and text data, such as HTML (Hyper Text Markup Language), enormous time and cost are required for transmitting video data, especially, animation data. Therefore, in the existing system, network traffic is restricted. On the other hand, in the conventional 3-dimensional CG, all of data including shape data, view data, and luminous data are processed as 3-dimensional data. With the progress of 3-dimensional CG technology, the quality of created image is improved rapidly, and the efficiency is significantly improved with regard to the data quantity when 3-dimensional CG data is transmitted as it is. Usually, the data compression ratio in the case of transmitting 3-dimensional CG data is $1/100$ or more as compared with the case of transmitting equivalent image data. Therefore, there is a movement on foot to standardize a method of transmitting 3-dimensional CG data through a network. For example, standardization of 3-dimensional CG data called VRML is proposed (VRML Ver2.0). The VRML Ver2.0 defines shape data called primitive, data formats of luminance data, view data, texture data and the like, and a method of specifying the motion of a rigid body.

Meanwhile, an animation technique for generating an image in real time has attracted attention in the field of 3-dimensional CG. By using the real-time animation technique, real motions of 3-dimensional CG characters are reproduced mainly in CM and movies. For example, a complicated shape such as a human being is represented by a skeletal structure, and the amounts of movement of joints of the skeleton, which change every moment, are defined, whereby the complicated motion can be naturally reproduced.

However, with the conventional 3-dimensional CG modeling languages on the Internet such as the VRML, it is impossible to set the motion in real time to a complicated shape such as a human being. Further, under the existing circumstances, it is impossible to transmit or receive motion data of a 3-dimensional CG character which moves as real as a human being, in real time, through a narrow band network such as a telephone line. In order to solve this problem, for example, Japanese Patent Application No. Hei. 10-203007 discloses a multiple-dimensional stream data transmission and reception apparatus which can transmit and receive motion data of a 3-dimensional CG character in real time.

In this prior art, however, although reproduction of a scene according to the stream data can be performed in real time, a viewer cannot enter the scene interactively to control the generated scene itself. For example, even when the viewer wants to control an object in a virtual space, although the object moves according to the will of the producer of the virtual space (i.e., it moves according to the stream data), the viewer cannot control the object. Further, the prior art cannot meet the viewer's demand to change the object to be controlled.

SUMMARY OF THE INVENTION

The present invention is made to solve the above-described problems and has for its object to provide a virtual space control data receiving apparatus which reproduces a virtual space in real time and permits the viewer to selectively control an object, in a dynamic virtual space represented by 3-dimensional CG, static image, dynamic image, audio and text, which are based on a network such as the Internet.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a virtual space control data receiving apparatus comprises: stream data receiving means for receiving a plurality of stream data for controlling a dynamic virtual space, according to the type of each stream data; manual data input means for inputting control data for an object to be controlled in the virtual space; and control data output means for outputting the control data input by the manual data input means, for the object controlled by the manual data input means, and outputting the stream data received by the stream data receiving means, for the other objects. Therefore, in a dynamic virtual space represented by 3-dimensional CG, static image, dynamic image, audio, and text which are based on a network such as the Internet, the viewer can move an object to be controlled, as he/she desires.

According to a second aspect of the present invention, a virtual space control data receiving apparatus comprises: stream data receiving means for receiving a plurality of stream data for controlling a dynamic virtual space, according to the type of each stream data; manual data input means for inputting selection data for selecting an object to be controlled in the virtual space, and control data for the selected object; and control data output means for outputting the control data input by the manual data input means, for the object selected by the manual data input means, and outputting the stream data received by the stream data receiving means, for the other objects. Therefore, in a dynamic virtual space represented by 3-dimensional CG, static image, dynamic image, audio, and text which are based on a network such as the Internet, the viewer can select an object to be controlled and move it as he/she desires.

According to a third aspect of the present invention, the virtual space control data receiving apparatus of the second aspect further comprises: manual control data conversion means for converting the control data input by the manual data input means, into control data suited to the object selected by the manual data input means; and the control data output means for outputting the control data converted by the manual control data conversion means, for the object selected by the manual data input means, and outputting the stream data received by the stream data receiving means, for the other objects. Therefore, in a dynamic virtual space represented by 3-dimensional CG, static image, dynamic image, audio, and text which are based on a network such as the Internet, the viewer can control a plurality of objects to be controlled, by using the same control data.

According to a fourth aspect of the present invention, the virtual space control data receiving apparatus of the second aspect further comprises: manual data transmission means for transmitting the selection data and the control data which are input by the manual data input means, to another virtual space control data receiving apparatus; manual data receiving means for receiving selection data and control data which are input to another virtual space control data receiving means; and the control data output means for outputting the control data input by the manual data input means, for the object selected by the manual data input means, and outputting the control data received by the manual data receiving means, for the object controlled by the selection data output from the manual data receiving means, and outputting the stream data received by the stream data receiving means, for the other objects. Therefore, in a dynamic virtual space represented by 3-dimensional CG, static image, dynamic image, audio, and text which are based on a network such as the Internet, the motion of an object controlled by another virtual space control data receiving apparatus can be reproduced and, furthermore, the viewer can select an object to be controlled and move it as he/she desires.

According to a fifth aspect of the present invention, the virtual space control data receiving apparatus of the third aspect further comprises: manual data transmission means for transmitting the selection data and the control data which are input by the manual data input means, to another virtual space control data receiving apparatus; manual data receiving means for receiving selection data and control data which are input to another virtual space control data receiving means; the manual control data conversion means for converting the control data output from the manual data input means and the manual data receiving means, into control data suited to the objects to be controlled by the selection data; and the control data output means for outputting the control data converted by the manual control data conversion means, for the object selected by the manual data input means and the object to be controlled by the selection data output from the manual data receiving means, and outputting the stream data received by the stream data receiving means, for the other objects. Therefore, in a dynamic virtual space represented by 3-dimensional CG, static image, dynamic image, audio, and text which are based on a network such as the Internet, the motion of an object controlled by another virtual space control data receiving apparatus can be reproduced and, furthermore, the viewer can select an object to be controlled and move it as he/she desires.

According to a sixth aspect of the present invention, the virtual space control data receiving apparatus according to any of the first to fifth aspects further comprises: scene data generation means for generating scene data for constituting the virtual space from the data output from the control data output means; drawing means for generating image data on the basis of the scene data generated by the scene data generation means; and display means for displaying the image data generated by the drawing means. Therefore, a dynamic virtual space can be represented on the basis of data such as 3-dimensional CG, static image, dynamic image, audio, and text which are based on a network such as the Internet.

According to a seventh aspect of the present invention, the virtual space control data receiving apparatus of the sixth aspect further comprises audio output means for outputting audio on the basis of the data output from the control data output means. Therefore, a dynamic virtual space can be represented on the basis of data such as 3-dimensional CG, static image, dynamic image, audio, and text which are based on a network such as the Internet.

According to an eighth aspect of the present invention, in the virtual space control data receiving apparatus according to any of the first to fourth aspects, the control data output means outputs the control data for the object to be controlled with the data input by the manual data input means, in synchronization with the stream data for the other objects. Therefore, the motion of an object or a part of an object to be controlled by the viewer can be reproduced in accordance with a dynamic virtual space represented by 3-dimensional CG, static image, dynamic image, audio, and text which are based on a network such as the Internet.

According to a ninth aspect of the present invention, a virtual space control data receiving apparatus comprises: stream data receiving means for receiving stream data, and dividing the stream data into motion stream data and other stream data to be output; manual control data input means for inputting motion data of an object or a part of an object to be motion-controlled manually; and motion control data output means for outputting, as scene generation motion data, the motion data supplied from the manual control data input means, for the object or part to be controlled with the motion data which is input by the manual control data input means, and outputting the motion stream data supplied from the stream data receiving means, for the other objects or parts. Therefore, in a dynamic virtual space represented by 3-dimensional CG, static image, dynamic image, audio, and text which are based on a network such as the Internet, the viewer can move an object or a part of an object to be controlled, as he/she desires.

According to a tenth aspect of the present invention, the virtual space control data receiving apparatus of the ninth aspect further comprises: control object selection means for inputting selection data for selecting an object or a part of an object, which is to be motion-controlled manually; the manual control data input means for inputting motion data for the object or part selected by the control object selection means; and the motion control data output means for outputting, as scene generation motion data, the motion data supplied from the manual control data input means, for the object or part selected by the control object selection means, and outputting the motion stream data supplied from the stream data receiving means, for the other objects or parts. Therefore, in a dynamic virtual space represented by 3-dimensional CG, static image, dynamic image, audio, and text which are based on a network such as the Internet, the viewer can select an object or a part of an object to be controlled, and move it as he/she desires.

According to an eleventh aspect of the present invention, a virtual space control data receiving apparatus comprises: stream data receiving means for receiving stream data, and dividing the stream data into motion stream data and other stream data to be output; manual control data input means for inputting control data for an object or a part of an object to be motion-controlled manually; manual control data conversion means for converting the control data input by the manual control data input means, into motion data suited to the object or part to be controlled; and motion control data output means for outputting, as scene generation motion data, the motion data output from the manual control data conversion means, for the object or part to be controlled with the control data which is input by the manual control data input means, and outputting the motion stream data supplied from the stream data receiving means, for the other objects or parts. Therefore, in a dynamic virtual space represented by 3-dimensional CG, static image, dynamic image, audio, and text which are based on a network such as the Internet, the viewer can move objects or parts to be controlled, as he/she desires, by using the same control data.

According to a twelfth aspect of the present invention, the virtual space control data receiving apparatus of the eleventh aspect further comprises: control object selection means for inputting selection data for selecting an object or a part of an object, which is to be motion-controlled manually; the manual control data input means for inputting control data for the object or part selected by the control object selection means; and the motion control data output means for outputting, as scene generation motion data, the motion data supplied from the manual control data conversion means, for the object or part selected by the control object selection means, and outputting the motion stream data supplied from the stream data receiving means, for the other objects or parts. Therefore, in a dynamic virtual space represented by 3-dimensional CG, static image, dynamic image, audio, and text which are based on a network such as the Internet, the viewer can select objects or parts of an object to be controlled, and move them by using the same control data.

According to a thirteenth aspect of the present invention, the virtual space control data receiving apparatus of the ninth aspect further comprises: manual control data transmission means for transmitting motion data of an object or a part of an object to be controlled, which is input by the manual control data input means, to the outside; manual control data receiving means for receiving motion data of an object or a part of an object to be controlled, which is transmitted from the outside; and the manual control data output means for outputting, as scene generation motion data, the motion data output from the manual control data input means, for the object or part to be controlled by the manual control data input means, and outputting the motion data received by the motion control data receiving means, for the object or part to be controlled by the motion data received by the manual control data receiving means, and outputting the motion stream data output from the stream data receiving means, for the other objects or parts. Therefore, in a dynamic virtual space represented by 3-dimensional CG, static image, dynamic image, audio, and text which are based on a network such as the Internet, the motion of an object controlled by another virtual space control data receiving apparatus can be reproduced and, furthermore, the viewer can move an object or a part of an object to be controlled, as he/she desires.

According to a fourteenth aspect of the present invention, the virtual space control data receiving apparatus of the tenth aspect further comprises: manual control data transmission means for transmitting motion data of an object or a part of an object to be controlled, which is input by the manual control data input means, to the outside; manual control data receiving means for receiving motion data of an object or a part of an object to be controlled, which is transmitted from the outside; selection data transmission means for transmitting the selection data input by the control object selection means, to the outside; selection data receiving means for receiving selection data transmitted from the outside; and the motion control data output means outputting, as scene generation motion data, the motion data output from the manual control data input means, for the object or part selected by the control object selection means, and outputting the motion data received by the manual control data receiving means, for the object or part selected by the selection data output from the selection data receiving means, and outputting the motion stream data output from the stream data receiving means for the other objects or parts. Therefore, in a dynamic virtual space represented by 3-dimensional CG, static image, dynamic image, audio, and text which are based on a network such as the Internet, the motion of an object controlled by another virtual space control data receiving apparatus can be reproduced and, furthermore, the viewer can move an object or a part of an object to be controlled, as he/she desires.

According to a fifteenth aspect of the present invention, the virtual space control data receiving apparatus of the eleventh aspect further comprises: manual control data transmission means for transmitting control data for an object or a part of an object to be controlled, which is input by the manual control data input means, to the outside; manual control data receiving means for receiving control data of an object or a part of an object to be controlled, which is transmitted from the outside; the manual control data conversion means for converting the control data input by the manual control data input means and the control data received by the manual control data receiving means, into motion data suited to the objects or parts to be controlled; and the motion control data output means for outputting, as scene generation motion data, the motion data output from the manual control data conversion means, for the object or part to be controlled with the control data input by the manual control data input means and the object or part to be controlled by the control data received by the manual control data receiving means, and outputting the motion stream data supplied from the stream data receiving means, for the other objects or parts. Therefore, in a dynamic virtual space represented by 3-dimensional CG, static image, dynamic image, audio, and text which are based on a network such as the Internet, the motion of an object controlled by another virtual space control data receiving apparatus can be reproduced and, furthermore, the viewer can move an object or a part of an object to be controlled, as he/she desires.

According to a sixteenth aspect of the present invention, the virtual space control data receiving apparatus of the twelfth aspect further comprises: manual control data transmission means for transmitting control data for an object or a part of an object to be controlled, which is input by the manual control data input means, to the outside; manual control data receiving means for receiving control data of an object or a part of an object to be controlled, which is transmitted from the outside; selection data transmission means for transmitting the selection data input by the control object selection means, to the outside; selection data receiving means for receiving selection data transmitted from the outside; the manual control data conversion means for converting the control data input by the manual control data input means and the control data received by the manual control data receiving means, into motion data suited to the objects or parts selected by the selection data output from the control object selection means and the selection data receiving means; and the motion control data output means for outputting, as scene generation motion data, the motion data output from the manual control data conversion means, for the objects or parts selected by the selection data from the control object selection means and the selection data receiving means, and outputting the motion stream data output from the stream data receiving means, for the other objects or parts. Therefore, in a dynamic virtual space represented by 3-dimensional CG, static image, dynamic image, audio, and text which are based on a network such as the Internet, the motion of an object controlled by another virtual space control data receiving apparatus can be reproduced and, furthermore, the viewer can select an object or a part of an object to be controlled, and move it as he/she desires.

According to a seventeenth aspect of the present invention, in the virtual space control data receiving apparatus according to any of the ninth to twelfth aspects, the motion control data output means outputs the scene generation motion data for the object or part to be controlled with the data input by the manual control data input means, in synchronization with the scene generation motion data for the other objects or parts. Therefore, the motion of an object or a part of an object controlled by the viewer can be reproduced in accordance with a dynamic virtual space represented by 3-dimensional CG, static image, dynamic image, audio, and text which are based on a network such as the Internet.

According to an eighteenth aspect of the present invention, in the virtual space control data receiving apparatus according to any of the thirteenth to sixteenth aspects, the motion control data output means outputs the scene generation motion data for the object or part to be controlled with the data input by the manual control data input means and the scene generation motion data for the object or part to be controlled with the data received by the manual control data receiving means, in synchronization with the scene generation motion data for the other objects or parts. Therefore, the motion of an object or a part of an object controlled by another virtual space control data receiving apparatus, and the motion of an object or a part of an object controlled by the viewer, can be reproduced in accordance with a dynamic virtual space represented by 3-dimensional CG, static image, dynamic image, audio, and text which are based on a network such as the Internet.

According to a nineteenth aspect of the present invention, in the virtual space control data receiving apparatus according to any of the eleventh, twelfth, fifteenth, and sixteenth aspects, tabled conversion data are used when the manual control data conversion means converts the inputted control data to motion data of an object of a part of an object. Therefore, conversion of control data to motion data is facilitated.

According to a twentieth aspect of the present invention, in the virtual space control data receiving apparatus according to any of the eleventh, twelfth, fifteenth, and sixteenth aspects, tabled key conversion data are interpolated when the manual control data conversion means converts the inputted control data to motion data of an object of a part of an object. Therefore, conversion of control data to motion data is facilitated.

According to a twenty-first aspect of the present invention, in the virtual space control data receiving apparatus according to any of the eleventh, twelfth, fifteenth, and sixteenth aspects, a neural network which has learned in advance is used when the manual control data conversion means converts the inputted control data to motion data of an object of a part of an object. Therefore, conversion of control data to motion data is facilitated.

According to a twenty-second aspect of the present invention, in the virtual space control data receiving apparatus according to any of the eleventh, twelfth, fifteenth, and sixteenth aspects, physical calculation for expressing physical characteristics of the selected object or part is used when the manual control data conversion means converts the inputted control data to motion data of an object of a part of an object. Therefore, conversion of control data to motion data is facilitated.

According to a twenty-third aspect of the present invention, the virtual space control data receiving apparatus according to any of the ninth to sixteenth aspects further comprises: scene generation means for generating scene data from the scene generation motion data output from the motion control data output means and from other computer graphics data required for generating a scene; drawing means for generating an image from the scene data generated by the scene generation means; and display means for displaying the image data generated by the drawing means. Therefore, a dynamic virtual space can be represented on the basis of data such as 3-dimensional CG, static image, dynamic image, audio, and text which are based on a network such as the Internet.

According to a twenty-fourth aspect of the present invention, a virtual space control data transmission and reception system comprises a virtual space control data transmission apparatus for transmitting a plurality of stream data for controlling a dynamic virtual space, in accordance with the type of each stream data; and a plurality of virtual space control data receiving apparatuses. In this apparatus, each of the virtual space control data receiving apparatuses comprises: stream data receiving means for receiving the stream data transmitted from the virtual space control data transmission apparatus, in accordance with the type of the stream data; manual data input means for inputting selection data for selecting an object to be controlled in the virtual space, and control data for the selected object; manual data transmission means for transmitting the selection data and the control data input by the manual data input means, to another virtual space control data receiving apparatus; manual data receiving means for receiving selection data and control data input to another virtual space control data receiving apparatus; and control data output means for outputting the control data input by the manual data input means, for the object selected by the manual data input means, and outputting the control data received by the manual data receiving means, for the object selected by the selection data of the manual data receiving means, and outputting the stream data received by the stream data receiving means, for the other objects. Therefore, in a dynamic virtual space represented by 3-dimensional CG, static image, dynamic image, audio, and text which are based on a network such as the Internet, the motion of an object controlled by another virtual space control data receiving apparatus can be reproduced and, furthermore, the viewer can select an object to be controlled and move it as he/she desires.

According to a twenty-fifth aspect of the present invention, a virtual space control data transmission and reception system comprises a virtual space control data transmission apparatus for transmitting a plurality of stream data for controlling a dynamic virtual space, in accordance with the type of each stream data; a plurality of virtual space control data receiving apparatuses; and a manual control data transmission means. In this apparatus, each of the virtual space control data receiving apparatuses comprises: stream data receiving means for receiving the stream data transmitted from the virtual space control data transmission apparatus, in accordance with the type of the stream data; manual data input means for inputting selection data for selecting an object to be controlled in the virtual space, and control data for the selected object; manual data transmission means for transmitting the selection data and the control data input by the manual data input means, to the manual control data transmission means; manual data receiving means for receiving selection data and control data input to another virtual space control data receiving apparatus, which data are transmitted from the manual control data transmission means; and control data output means for outputting the control data input by the manual data input means, for the object selected by the manual data input means, and outputting the control data received by the manual data receiving means, for the object selected by the selection data of the manual data receiving means, and outputting the stream data received by the stream data receiving means, for the other objects. Therefore, in a dynamic virtual space represented by 3-dimensional CG, static image, dynamic image, audio, and text which are based on a network such as the Internet, the motion of an object controlled by another virtual space control data receiving apparatus can be reproduced and, furthermore, the viewer can select an object to be controlled and move it as he/she desires.

According to a twenty-sixth aspect of the present invention, a virtual space control data receiving method comprises: stream data receiving step of receiving a plurality of stream data for controlling a dynamic virtual space, according to the type of each stream data; manual data input step of inputting control data for an object to be controlled in the virtual space; and control data output step of outputting the control data input by the manual data input means, for the object controlled in the manual data input step, and outputting the stream data received in the stream data receiving step, for the other objects. Therefore, in a dynamic virtual space represented by 3-dimensional CG, static image, dynamic image, audio, and text which are based on a network such as the Internet, the viewer can move an object to be controlled, as he/she desires.

According to a twenty-seventh aspect of the present invention, a virtual space control data receiving method comprises: stream data receiving step of receiving a plurality of stream data for controlling a dynamic virtual space, according to the type of each stream data; manual data input step of inputting selection data for selecting an object to be controlled in the virtual space, and control data for the selected object; and control data output step of outputting the control data input in the manual data input step, for the object selected in the manual data input step, and outputting the stream data received in the stream data receiving step, for the other objects. Therefore, in a dynamic virtual space represented by 3-dimensional CG, static image, dynamic image, audio, and text which are based on a network such as the Internet, the viewer can select an object to be controlled and move it as he/she desires.

According to a twenty-eighth aspect of the present invention, a virtual space control data receiving method comprises: stream data receiving step of receiving stream data, and dividing the stream data into motion stream data and other stream data to be output; manual control data input step of inputting motion data of an object or a part of an object to be motion-controlled manually; and motion control data output step of outputting, as scene generation motion data, the motion data supplied from the manual control data input step, for the object or part to be controlled with the motion data which is input in the manual control data input step, and outputting the motion stream data supplied from the stream data receiving step, for the other objects or parts. Therefore, in a dynamic virtual space represented by 3-dimensional CG, static image, dynamic image, audio, and text which are based on a network such as the Internet, the viewer can move an object to be controlled, as he/she desires.

According to a twenty-ninth aspect of the present invention, a virtual space control data receiving method comprises: stream data receiving step of receiving stream data, and dividing the stream data into motion stream data and other stream data to be output; manual control data input step of inputting control data for an object or a part of an object to be motion-controlled manually; manual control data conversion step of converting the control data input in the manual control data input step, into motion data suited to the object or part to be controlled; and motion control data output step of outputting, as scene generation motion data, the motion data output from the manual control data conversion step, for the object or part to be controlled with the control data which is input in the manual control data input step, and outputting the motion stream data supplied from the stream data receiving step, for the other objects or parts. Therefore, in a dynamic virtual space represented by 3-dimensional CG, static image, dynamic image, audio, and text which are based on a network such as the Internet, the viewer can move an object to be controlled, as he/she desires.

According to a thirtieth aspect of the present invention, there is provided a recording medium containing a virtual space control data receiving program for receiving data for controlling a virtual space, and the program comprises: stream data receiving step of receiving a plurality of stream data for controlling a dynamic virtual space, according to the type of each stream data; manual data input step of inputting control data for an object to be controlled in the virtual space; and control data output step of outputting the control data input by the manual data input means, for the object controlled in the manual data input step, and outputting the stream data received in the stream data receiving step, for the other objects. Therefore, in a dynamic virtual space represented by 3-dimensional CG, static image, dynamic image, audio, and text which are based on a network such as the Internet, the viewer can move an object to be controlled, as he/she desires.

According to a thirty-first aspect of the present invention, there is provided a recording medium containing a virtual space control data receiving program for receiving data for controlling a virtual space, and the program comprises: stream data receiving step of receiving a plurality of stream data for controlling a dynamic virtual space, according to the type of each stream data; manual data input step of inputting selection data for selecting an object to be controlled in the virtual space, and control data for the selected object; and control data output step of outputting the control data input in the manual data input step, for the object selected in the manual data input step, and outputting the stream data received in the stream data receiving step, for the other objects. Therefore, in a dynamic virtual space represented by 3-dimensional CG, static image, dynamic image, audio, and text which are based on a network such as the Internet, the viewer can select an object to be controlled and move it as he/she desires.

According to a thirty-second aspect of the present invention, there is provided a recording medium containing a virtual space control data receiving program for receiving data for controlling a virtual space, and the program comprises: stream data receiving step of receiving stream data, and dividing the stream data into motion stream data and other stream data to be output; manual control data input step of inputting motion data of an object or a part of an object to be motion-controlled manually; and motion control data output step of outputting, as scene generation motion data, the motion data supplied from the manual control data input step, for the object or part to be controlled with the motion data which is input in the manual control data input step, and outputting the motion stream data supplied from the stream data receiving step, for the other objects or parts. Therefore, in a dynamic virtual space represented by 3-dimensional CG, static image, dynamic image, audio, and text which are based on a network such as the Internet, the viewer can move an object to be controlled, as he/she desires.

According to a thirty-third aspect of the present invention, there is provided a recording medium containing a virtual space control data receiving program for receiving data for controlling a virtual space, and the program comprises: stream data receiving step of receiving stream data, and dividing the stream data into motion stream data and other stream data to be output; manual control data input step of inputting control data for an object or a part of an object to be motion-controlled manually; manual control data conversion step of converting the control data input in the manual control data input step, into motion data suited to the object or part to be controlled; and motion control data output step of outputting, as scene generation motion data, the motion data output from the manual control data conversion step, for the object or part to be controlled with the control data which is input in the manual control data input step, and outputting the motion stream data supplied from the stream data receiving step, for the other objects or parts. Therefore, in a dynamic virtual space represented by 3-dimensional CG, static image, dynamic image, audio, and text which are based on a network such as the Internet, the viewer can move an object to be controlled, as he/she desires.

BRIEF DESCRIPTION OF THE DRAWINGS

FIG. 9($a$) is a diagram for explaining a channel definition packet and a data packet, and FIG. 9($b$) is a diagram for explaining a method for transmitting channel definition packets and data packets.

FIGS. 13($a$)–13($d$) are diagrams for explaining a control data packet, a method for transmitting control data packets, a selection data packet, and a method for transmitting selection data packets and control data packets, respectively.

DETAILED DESCRIPTION OF THE PREFERRED EMBODIMENTS

Embodiment 1

Hereinafter, a virtual space control data receiving apparatus according to a first embodiment of the present invention will be described with reference to drawings. In this first embodiment, a dynamic virtual space is defined as a virtual space constituted by 3-dimensional CG and audio, and the constituents of the virtual space include dynamic elements (i.e., time-varying elements), for example, elements which move or change in shape with time, mapped textures to be changed with time (including dynamic image mapping), and audio to be changed with time. Further, with respect to 3-dimensional CG, besides the ordinary 3-dimensional CG technique, the 3-dimensional CG animation technique is included.

Figure 1:
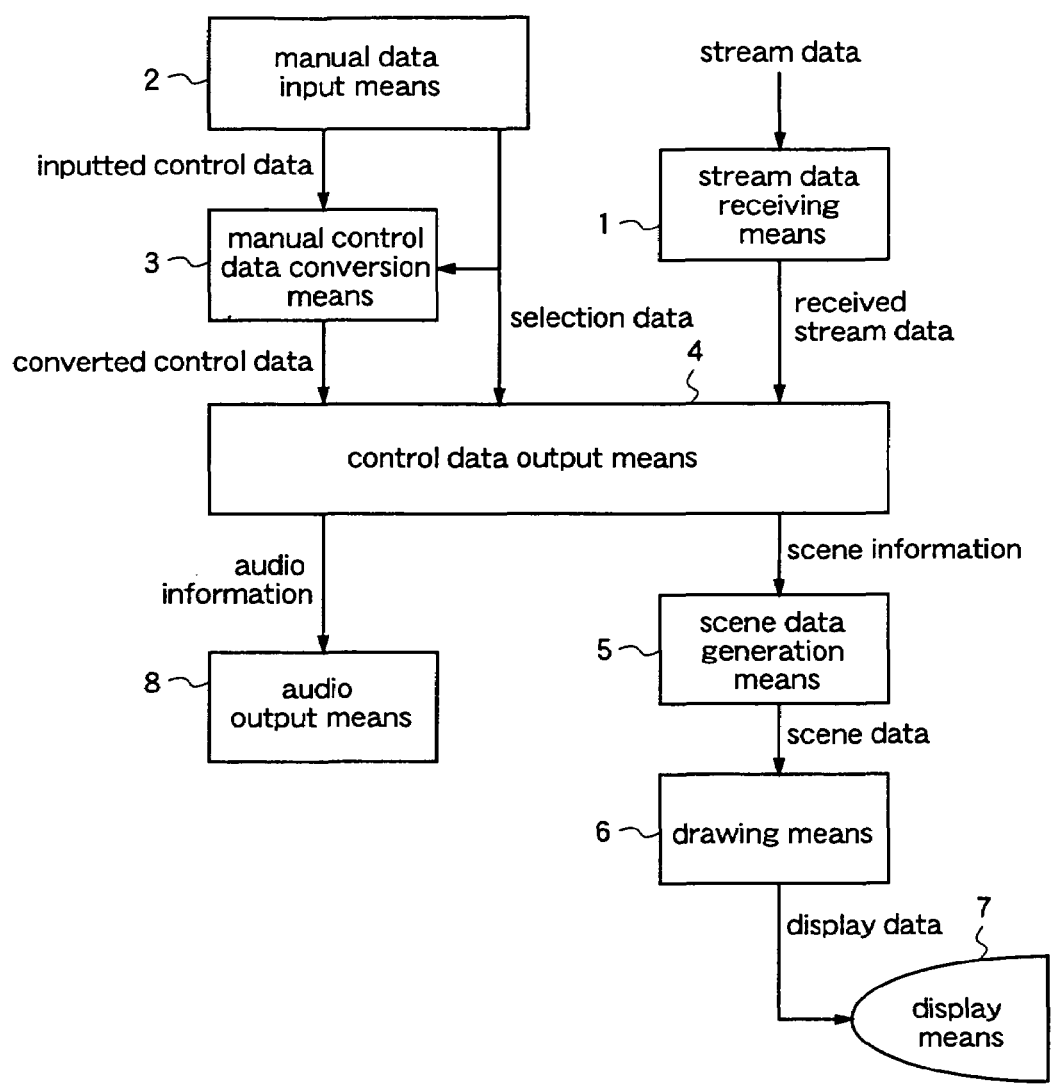
FIG. 1 is a block diagram illustrating a virtual space control data receiving apparatus according to a first embodiment of the present invention.

FIG. 1 is a block diagram illustrating the structure of the virtual space control data receiving apparatus according to the first embodiment. With reference to FIG. 1, the virtual space control data receiving apparatus comprises a stream data receiving means 1, a manual data input means 2, a manual control data conversion means 3, a control data output means 4, a scene data generation means 5, a drawing means 6, a display means 7, and an audio output means 8.

Figure 2:
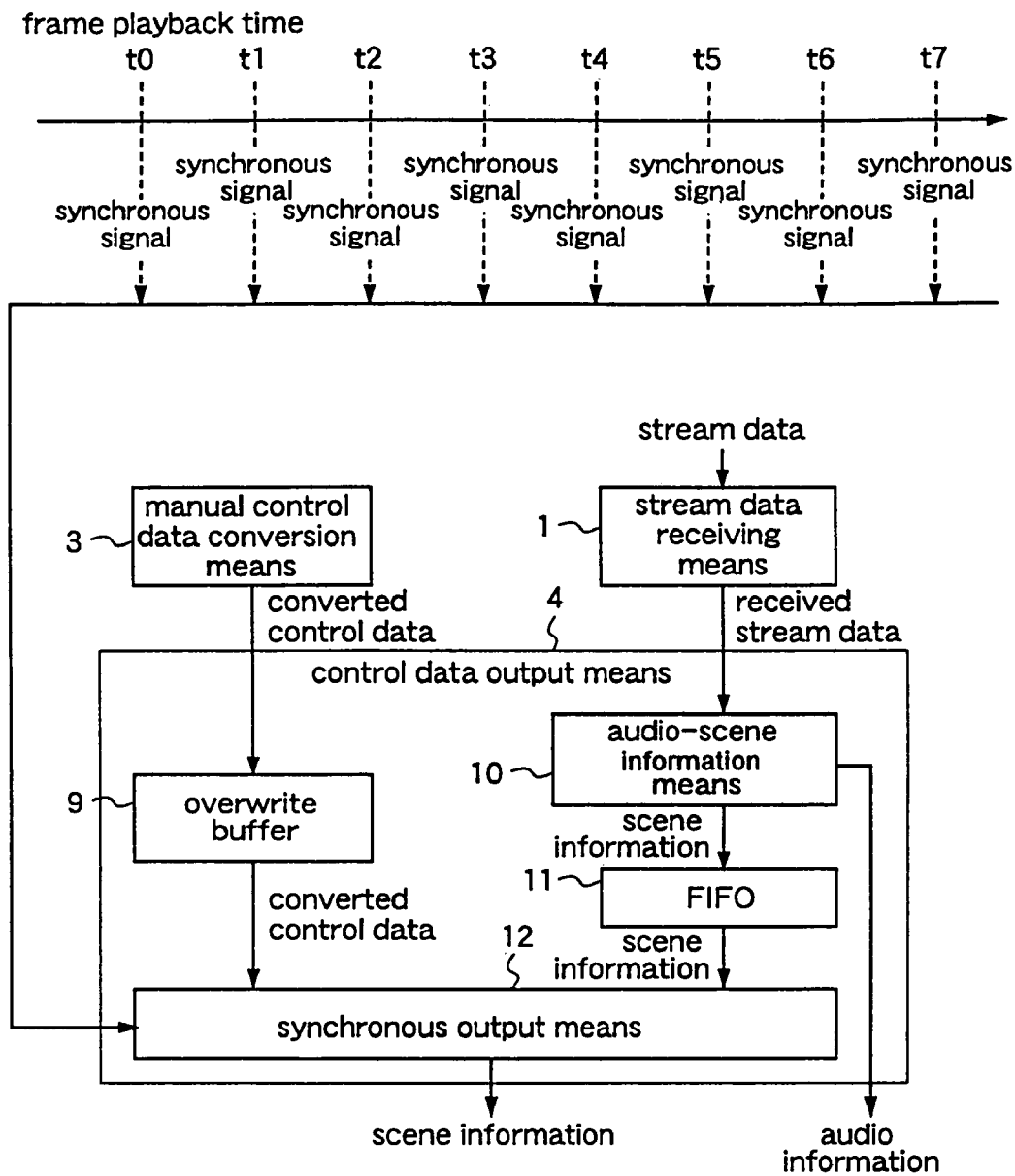
FIG. 2 is a diagram for explaining the structure and synchronous operation of a control data output means according to the first embodiment.

FIG. 2 is a diagram illustrating the structure of the control data output means 4 and the synchronous operation. With reference to FIG. 2, the control data output means 4 comprises an overwrite buffer 9, an identification means 10 for identifying audio data and scene data, an FIFO (memory) 11, and a synchronous output means 12.

Hereinafter, the respective constituents of the virtual space control data receiving apparatus will be described in detail.

A plurality of stream data are supplied from external apparatus to the stream data receiving means 1. These stream type data are called "stream data". According to the kind of each stream data, a channel is assigned to each stream data, and a unique channel number is given to each channel. An example of a format of stream data is shown in FIGS. 9(a) and 9(b). The stream data is transmitted in units of packets. There are two kinds of packets, channel definition packets and data packets. FIG. 9(a) shows the contents of these packets, and each packet is composed of a header section and a data section. The header section of the channel definition packet is composed of a packet identifier indicating that this packet is a channel definition packet, a time stamp indicating the time from a reference time when this packet was generated, the total number of transmissible channels Tc, a compression method identifier indicating the compression method of the data to be transmitted (if there are plural compression methods, a method is defined for each channel), and a packet size indicating the size of the packet. The data section of the channel definition packet is composed of, for one channel, a channel identifier indicating the channel number, the data size of the channel, a channel type indicating the data type of the channel (vector type data, scalar type data, etc), and a channel name indicating the name of data of the channel. That is, the data section comprises these components as many as the total channel number Tc. Likewise, the header section of the data packet is composed of a packet identifier indicating that this packet is a data packet, a time stamp indicating the time from a reference time when this packet was generated, and the total number of channels Dc to be transmitted (Dc≦Tc). The data section of the data packet is composed of, for one channel, a channel identifier indicating the channel number, and compressed or non-compressed data to be transmitted (channel data) equivalent to the packet size. That is, the data section comprises these components as many as the total channel number Dc. The data packet is equivalent to a unit called "block" which is generally used as a transmission unit. FIG. 9(b) shows the transmission method of these packets. Initially, a channel definition packet is transmitted and then a data packet corresponding to the channel definition packet is transmitted. If the channel definition is desired to be changed during transmission, a new channel definition packet in which the changed contents are defined is transmitted and, thereafter, a data packet corresponding to this new channel definition packet is transmitted.

On receipt of the data stream, the stream data receiving means 1 receives the channel definition packet and the corresponding data packet, and reconstructs the data to the original stream data to be output to the control data output means 4. When the input stream data has been compressed, it is subjected to decompression adapted to the compression method and then reconstructed.

The manual data input means 2 performs selection of an object to be controlled (hereinafter, referred to as a control object) and input of control data. This input means 2 outputs the inputted selection data to the manual control data conversion means 3 and to the control data output means 4, and outputs the inputted control data to the manual control data conversion means 3. The manual data input means 2 is, for example, a mouse, a keyboard, a joy stick, a joy pad, a data graph, or a real-time motion capturing system. When audio is to be input, a mike or a keyboard is adopted as the input means 2. An identifier or a number is previously given to an object which can be manually controlled by the operator, and the identifier itself is used as selection data. When the display means 7 and the manual data input means 2 are conjoined, an internal point of a control object display area in the display screen may be selected to calculate an identifier of the control object from the internal point data.

The manual control data conversion means 3 converts the control data supplied from the manual data input means 2 into control data for the control object. The converted control data is transmitted to the control data output means 4. Since the inputted control data supplied from the manual data input means 2 is not always control data of the control object, the manual control data conversion means 3 is required. Further, when there are plural control objects, the inputted control data should be converted to control data for the respective control objects. For example, when the input data at the manual data input means 2 is numerical data of 8 bits and the control object is an angle, this 8-bit data should be converted to angle data. When the control object is the velocity of motion, the 8-bit data should be converted to velocity data. On the other hand, when the control object is simply controlled by ON and OFF and the manual data input means 2 is capable of 2-bit input, the input data itself is transmitted. So, in this case, the manual control data conversion means 3 is not necessary. That is, when all of the control objects can be controlled by the same control data and thus there is no necessity of converting the inputted control data, the manual control data conversion means 3 can be dispensed with.

The control data output means 4 outputs the converted control data supplied from the manual control data conversion means 3, for the control object selected by the selection data supplied from the manual data input means 2, and outputs the received stream data transmitted from the stream data receiving means 1, for the other control objects. For example, when there are plural moving objects, for a control object the motion of which is decided to be controlled manually, the converted control data is output. For the other moving objects, the received stream data is output. The output data is transmitted according to its type. That is, audio data is transmitted as audio information to the audio output means 8, and data for constructing a scene of a virtual space by 3-dimensional CG is transmitted as scene information to the scene data generation means 5. Since the control data output means 4 is a kind of switcher, it is provided with a table describing identifiers of the respective control objects and information as to whether the respective control objects are based on the audio information or the scene information, and output data and their destinations are decided on the basis of the table.

Next, the synchronous operation of the control data output means 4 will be described with reference to FIG. 2. The overwrite buffer 9 receives the converted control data from the manual control data conversion means 3 during the frame playback period, writes the data while updating it, and outputs the recently written data. The audio/scene identification means 10 identifies the received stream data from the stream data receiving means 1, sends the audio information to the audio output means 8, and writes the scene information into the FIFO 11. On receipt of a synchronous signal, the synchronous output means 12 reads data from the overwrite buffer 9 and the FIFO 11, and outputs scene information. At this time, if the scene information in the FIFO 11 overlaps the converted control data written in the overwrite buffer 9, only the converted control data is output from the overwrite buffer 9 while the overlapping scene information is not output from the FIFO 11.

The scene data generation means 5 generates a scene at each frame time on the basis of the scene information transmitted from the control data output means 4 and the 3-dimensional CG data for constituting a virtual space, which has previously been retained.

The drawing means 6 generates a 3-dimensional CG image, and the generated 3-dimensional CG image is displayed by the display means 7. Currently, a 3-dimensional CG drawing board on the market may be used as the drawing means 6, and a CRT or a liquid crystal display may be used as the display means 7.

The audio output means 8 outputs audio to the outside on the basis of the input audio information. For example, a sound board and a speaker on the market may be used. When the audio information is an MIDI signal, an MIDI board, sound source data, and a speaker may be used.

Figure 10:
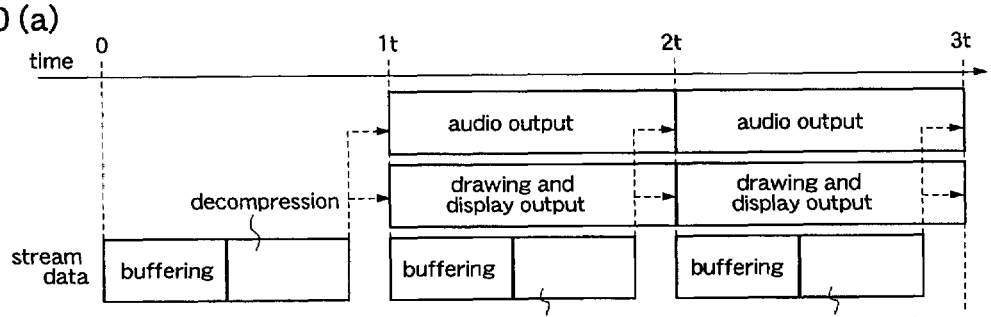
FIG. 10($a$) is a diagram for explaining multi-thread processing for stream data, and FIG. 10($b$) is a diagram for explaining double buffering for stream data.
Figure 10:
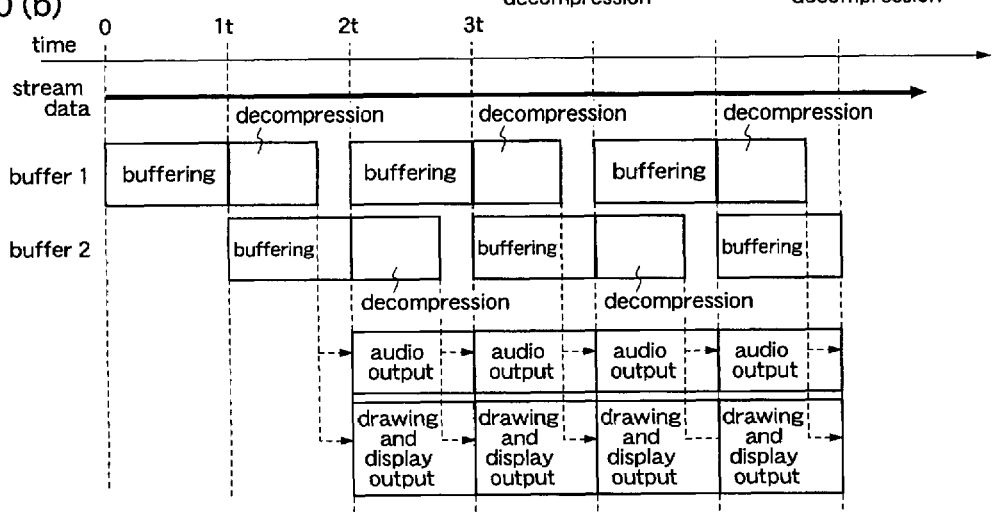

Since the stream data is transmitted in packet units, it is effective with regard to processing speed to perform the input data buffering and decompression process, the drawing or display process, and the audio output process, as multi-process or multi-thread as shown in FIG. 10(*a*). Further, when using double buffers 1 and 2, as shown in FIG. 10(*b*), buffering and decompression are performed while switching the buffer 1 and the buffer 2, whereby the stream continuity is reliably assured.

As described above, the virtual space control data receiving apparatus according to the first embodiment of the present invention comprises the stream data receiving means for receiving a plurality of stream data for controlling a dynamic virtual space in accordance with the kinds of the respective stream data; the manual data input means for receiving selection data for selecting an object to be controlled in the virtual space and control data for the selected object; and the control data output means which outputs the control data supplied from the manual data input means for the object selected by the manual data input means, and outputs the stream data received by the stream data receiving means, for the other objects. Therefore, in a dynamic virtual space represented by 3-dimensional CG, static image, dynamic image, audio and text which are based on a network such as the Internet, the viewer can arbitrarily select an object to be controlled and move the object as he/she desires.

The virtual space control data receiving apparatus according to the first embodiment further comprises the manual control data conversion means for converting the control data supplied from the manual data input means into control data according to the object selected by the manual data input means, and the control data output means outputs the control data converted by the manual control data conversion means for the object selected by the manual data input means and outputs the stream data received by the stream data receiving means for the other objects. Therefore, in a dynamic virtual space represented by 3-dimensional CG, static image, dynamic image, audio and text which are based on a network such as the Internet, the viewer can control all of plural control objects by the same control data.

The virtual space control data receiving apparatus according to the first embodiment further comprises the scene data generation means for generating scene data constituting a virtual space, from the data output from the control data output means; the drawing means for generating image data on the basis of the scene data generated by the scene data generation means; and the display means for displaying the image data generated by the drawing means. Therefore, a dynamic virtual space can be represented by 3-dimensional CG, static image, dynamic image, and text which are based on a network such as the Internet.

Embodiment 2

Figure 3:
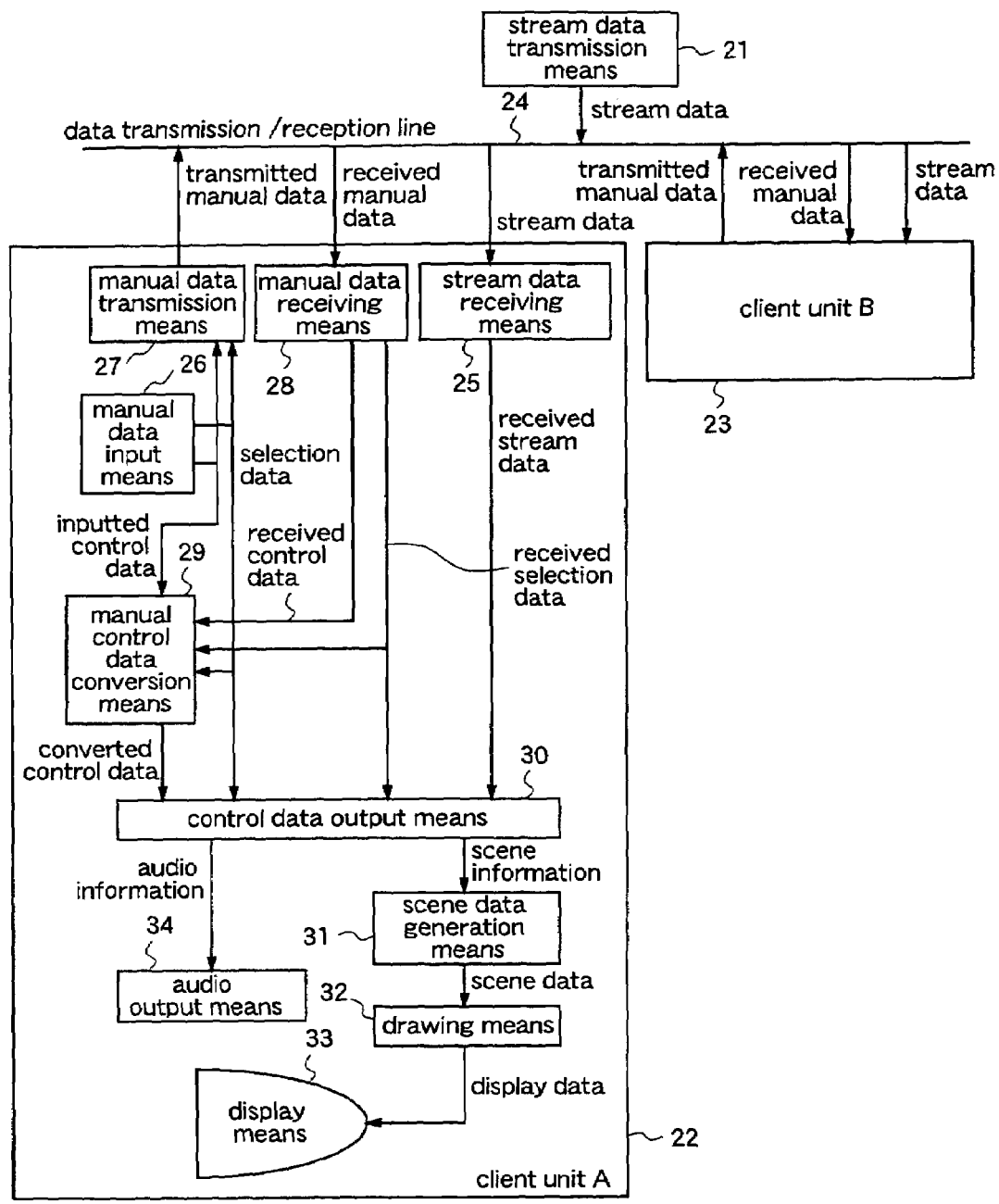
FIG. 3 is a block diagram illustrating a virtual space control data receiving apparatus according to a second embodiment of the present invention.

FIG. 3 is a block diagram illustrating the structure of a virtual space control data receiving apparatus according to a second embodiment of the present invention. The virtual space control data receiving apparatus comprises a stream data transmission means 21, a client unit A 22, a client unit B 23, a data transmission/reception line 24, a stream data receiving means 25, a manual data input means 26, a manual data transmission means 27, a manual data receiving means 28, a manual control data conversion means 29, a control data output means 30, a scene data generation means 31, a drawing means 32, a display means 33, and an audio output means 34.

The client unit B 23 has the same structure as that of the client unit A 22. While in this second embodiment the processes will be described with two client units, the contents of the processes are identical even when three or more client units are provided. Therefore, a virtual space control data receiving apparatus having three or more client units is also within the scope of this second embodiment.

The scene data generation means 31, the drawing means 32, the display means 33, and the audio output means 34 are identical to the scene data generation means 5, the drawing means 6, the display means 7, and the audio output means 8 according to the first embodiment, respectively.

The respective constituents of the virtual space control data receiving apparatus so constructed will be described in detail.

The stream data transmission means 21 transmits the above-described stream data, packet by packet, to the client unit A 22 and the client unit B 23. The data transmission is performed by, for example, a broadcasting method through the data transmission/reception line 24. The data transmission/reception line 24 is a network such as the Internet, a telephone line, a private line, or the Ethernet.

In the client unit A 22, the stream data receiving means 25 receives the stream data which is broadcast by the stream data transmission means 21, in like manner as described for the stream data receiving means 1 of the first embodiment. The received stream data is processed by the stream data receiving means 25 in like manner as described for the stream data receiving means 1, and the processed data is output to the control data output means 30.

The manual data input means 26 is for inputting selection data for a control object and control data thereof, like the manual data input means 2 of the first embodiment. The selection data is output to the manual data transmission means 27, the manual control data conversion means 29, and the control data output means 30. The control data is output to the manual data transmission means 27 and the manual control data conversion means 29.

On receipt of the selection data and the control data from the manual data input means 26, the manual data transmission means 27 transmits these data through the data transmission/reception line 24 to another client unit, i.e., the client unit B 23. When the control data should be compressed when being transmitted, the manual data transmission means 27 compresses the data. This transmission is performed in packet (block) units by using control data packets and selection data packets shown in FIGS. 13(a) and 13(c), respectively. These two kinds of data packets are called generically as "transmission manual data". The header section of the selection data packet is composed of a client identifier which is an identifier of a client unit to which the packet is to be transmitted, for example, a TCP/IP address; a packet identifier indicating that this packet is a selection data packet; a control object identifier specifying a control object; a time stamp indicating the time from a reference time at which this packet was generated; the total number of transmissible channels (Tc); a compression method identifier indicating a compression method by which control data to be transmitted is compressed (when there are plural compression methods, a compression method is defined for each channel); and a packet size indicating the size of the packet. The data section of the selection data packet is composed of, for one channel, a channel identifier indicating the channel number; the size of data of this channel; a channel type indicating the type of data of this channel (vector type data, scalar type data, etc.); and a channel name indicating the name of data of this channel. The data section contains these components as many as the total number of channels Tc. Likewise, the header section of the control data packet is composed of a client identifier; a packet identifier indicating that this packet is a control data packet; a time stamp indicating the time from a reference time at which this packet was generated; and the total number of channels (Dc) to be transmitted (DC$\leq$Tc). The data section of the control data packet is composed of, for one channel, a channel identifier indicating the channel number, and compressed or non-compressed data to be transmitted, which is equivalent to the packet size. The data section contains these components as many as the total number of channels Dc. FIG. 13(d) shows a method for transmitting these packets. Initially, the selection data packet is transmitted and, subsequently, the control data packets are transmitted. When the control object is changed, a selection data packet corresponding to the new control object is transmitted, followed by control data packet for this control object.

The manual data receiving means 28 receives reception manual data transmitted from another client unit, i.e., the client unit B 23. On receipt of the reception manual data, the manual data receiving means 28 outputs reception selection data which specifies a control object according to the selection data packet, to the manual control data conversion means 29 and to the control data output means 30. Further, the manual data receiving means 28 outputs reception control data which is control data corresponding to the control object, from the control data packet of the reception manual data to the manual control data conversion means 29. When the reception manual data is compressed, the manual data receiving means 28 decompresses the data.

The manual control data conversion means 29 processes the input data in the same manner as described for the manual control data conversion means 3 of the first embodiment, and outputs converted control data to the control data output means 30. However, in the conversion means 29, not only the control data output from the manual data input means 26 but also the reception control data output from the manual data receiving means 28 are processed. When the number of client units increases, reception control data from these units are processed by the manual control data conversion means 29 as well.

The control data output means 30 outputs the converted control data from the manual data receiving means 28 for the control object selected by the selection data which has been input by the manual data input means 26 and for the control object selected by the reception selection data output from the manual data receiving means 28, and outputs the received stream data transmitted from the stream data receiving means 25 for the other control objects, like the control data output means 4 according to the first embodiment of the invention. At this time, scene information is output to the scene generation means 31 while audio information is output to the audio output means 34.

As described above, the virtual space control data receiving apparatus according to this second embodiment is provided with the manual data transmission means for transmitting the selection data and the control data, which are output from the manual data input means, to another virtual space control data receiving apparatus, and the manual data receiving means for receiving the selection data and the control data which are output from the other virtual space control data receiving apparatus. The control data output means outputs the control data supplied from the manual data input means for the object selected by the manual data input means, and outputs the control data received by the manual data receiving means for the object controlled by the selection data in the manual data receiving means, and outputs the stream data received by the stream data receiving means for the other objects. Therefore, in a dynamic virtual space represented by 3-dimensional CG, static image, dynamic image, audio and text which are based on a network such as the Internet, the motion of an object controlled by another virtual space control data receiving apparatus can be reproduced.

Embodiment 3

Figure 4:
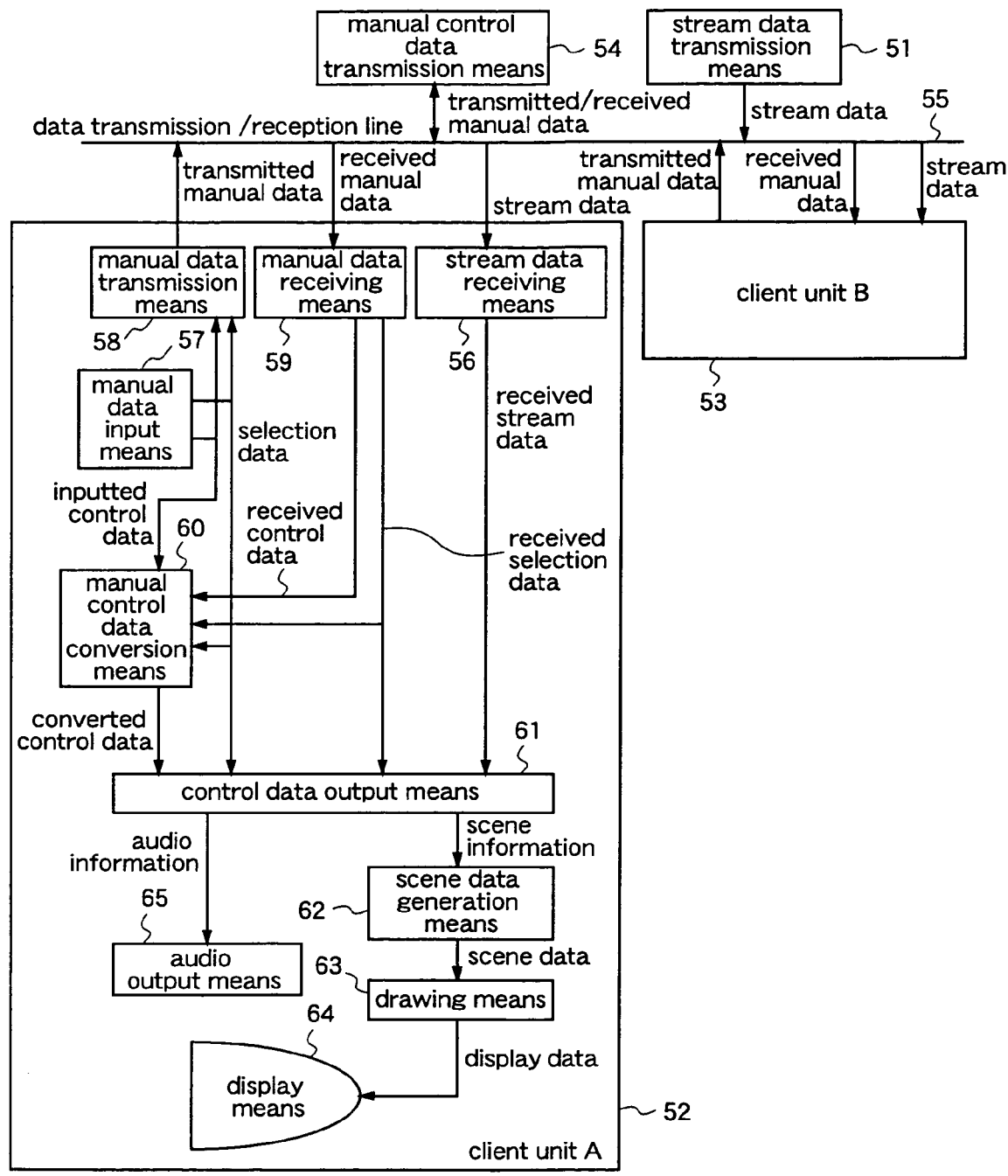
FIG. 4 is a block diagram illustrating a virtual space control data transmission and reception system according to a third embodiment of the present invention.

FIG. 4 is a block diagram illustrating the structure of a virtual space control data transmission and reception system according to a third embodiment of the present invention. This system comprises a stream data transmission means 51, a client unit A 52, a client unit B 53, a manual control data transmission means 54, a data transmission/reception line 55, a stream data receiving means 56, a manual data input means 57, a manual data transmission means 58, a manual data receiving means 59, a manual control data conversion means 60, a control data output means 61, a scene data generation means 62, a drawing means 63, a display means 64, and an audio output means 65. The structure of the client unit B 53 is identical to that of the client unit A 52. While in this third embodiment two client units are used to explain the processes performed by the virtual space control data transmission and reception system, the contents of the processes are identical even when three or more client units are used. Therefore, a virtual space control data transmission and reception system having three or more client units is also within the scope of this third embodiment.

The scene data generation means 62, the drawing means 63, the display means 64, and the audio output means 65 are identical to the scene data generation means 5, the drawing means 6, the display means 7, and the audio output means 8 according to the first embodiment, respectively.

The respective constituents of the virtual space control data transmission and reception system so constructed will be described in detail. The stream data transmission means 51 transmits stream data through the data transmission/reception line 55, like the stream data transmission means 21.

In the client unit A 52, the stream data receiving means 56 receives the stream data transmitted through the data transmission/reception line 55 and processes the stream data, in like manner as described for the stream data receiving means 25 of the second embodiment. The received stream data is output to the control data output means 61.

The manual data input means 57 outputs inputted selection data to the manual data transmission means 58, the manual control data conversion means 60, and the control data output means 61. Further, it outputs inputted control data to the manual data transmission means 58 and the manual data conversion means 60.

On receipt of the selection data and the control data output from the manual data input means 57, the manual data transmission means 58 transmits transmission manual data through the data transmission/reception line 55 to the manual control data transmission means 54. The transmission manual data is identical to that already described for the second embodiment.

The manual control data transmission means 54 receives transmission manual data transmitted from the client unit A 52 or the client unit B 53, and transmits it as reception manual data to plural client units other than the client unit which has transmitted the data. In this third embodiment, for example, the transmission manual data from the client unit A 52 is transmitted to the client unit B 53 alone. However, the transmission manual data may be transmitted to two or more client units by performing exclusion.

The manual data receiving means 59 receives the reception manual data transmitted from the manual control data transmission means 54. On receipt of the reception manual data, the manual data receiving means 59 outputs reception selection data which specifies a control object from the selection data packet, to the manual control data conversion means 60 and the control data output means 61. Further, the manual data receiving means 59 outputs reception control data which is control data for the specified control object, from the control data packet of the reception manual data to the manual control data conversion means 60. When the reception manual data is compressed, the manual data receiving means 59 decompresses the data.

The manual control data conversion means 60 processes the input data in the same manner as described for the manual control data conversion means 29 of the second embodiment, and outputs converted control data to the control data output means 61.

The control data output means 61 outputs the converted control data supplied from the manual control data conversion means 60 for the control object selected by the selection data which has been input by the manual data input means 57 and for the control object selected by the reception selection data which has been output from the manual data receiving means 59, and outputs the received stream data transmitted from the stream data receiving means 56 for the other control objects, like the control data output means 30 according to the second embodiment. At this time, scene information is output to the scene generation means 62 while audio information is output to the audio output means 65.

In the first, second, and third embodiments, the above-described processes can be performed in synchronization with each other. Especially, performing synchronous processing in the control data output means 4, the control data output means 30, or the control output means 61 is effective for synchronous control of the audio and the virtual space. Further, a virtual space control data transmission and reception system can be realized by combining the first or second embodiment with a server computer of a server client model.

As described above, the virtual space control data transmission and reception system according to the third embodiment is provided with a virtual space control data transmission unit which transmits a plurality of stream data for controlling a dynamic virtual space, according to the kind of each stream data; a plurality of virtual space control data receiving units; and a manual control data transmission means for transmitting selection data and control data which are input to the virtual space control data receiving units, and the manual control data transmission means performs exclusion. Therefore, two or more virtual space control data receiving units can be connected. Thereby, in a dynamic virtual space represented by 3-dimensional CG, static image, dynamic image, audio and text which are based on a network such as the Internet, the motion of an object controlled by another virtual space control data receiving apparatus can be reproduced and, moreover, the viewer can move the control object as he/she desires.

Embodiment 4

Hereinafter, a virtual space control data receiving apparatus according to a fourth embodiment of the present invention will be described with reference to drawings.

Figure 5:
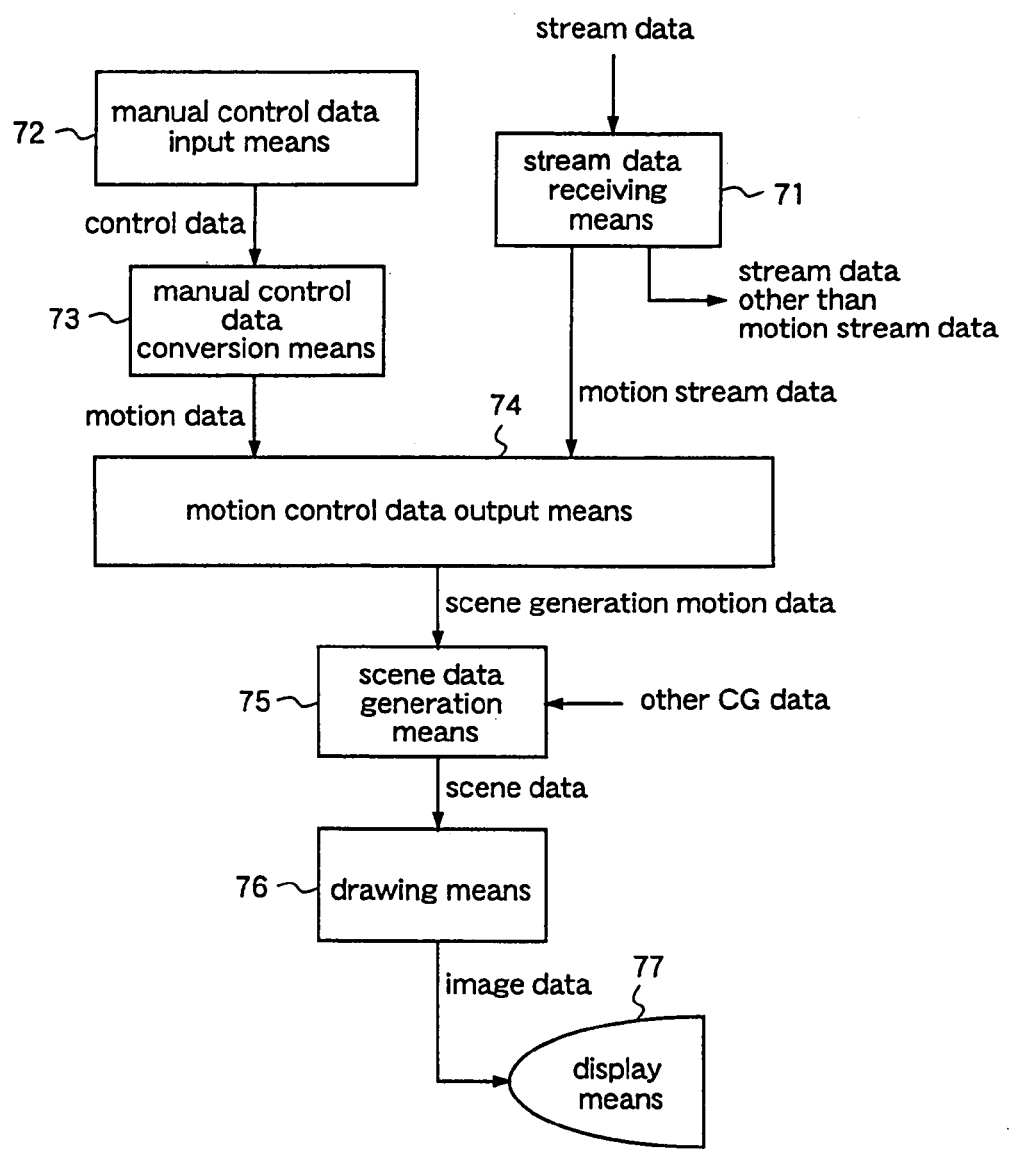
FIG. 5 is a block diagram illustrating a virtual space control data receiving apparatus according to a fourth embodiment of the present invention.

FIG. 5 is a block diagram illustrating the structure of the virtual space control data receiving apparatus according to the fourth embodiment. The apparatus comprises a stream data receiving means 71, a manual control data input means 72, a manual control data conversion means 73, a motion control data output means 74, a scene data generation means 75, a drawing means 76, and a display means 77.

Hereinafter, the respective constituents of the apparatus will be described in more detail.

The stream data receiving means 71 receives a channel definition packet and a data packet, and discriminates a channel corresponding to motion stream data from other channels, according to the contents of the channel definition packet. Thereafter, the stream data receiving means 71 reconfigures the motion stream data from the data packet of the channel corresponding to the motion stream data, and outputs it to the motion control data output means 74. Stream data corresponding to other channels are transmitted to other processing systems. Since the channel definition is not changed until another channel definition packet is transmitted, the channel corresponding to the motion stream data is fixed, and the motion stream data of the fixed channel is reconfigured. When another channel definition packet is transmitted, the contents of the transmitted channel definition packet are examined, and the motion stream data is reconfigured from channel data corresponding to the motion stream, on the basis of the changed channel definition. Other channel data are transmitted to other processing systems as described above. When the transmitted channel data corresponding to the motion stream data is compressed, the data is decompressed by a decompression method adapted to the compression method and, thereafter, the motion stream data is reconfigured.

Figure 11:
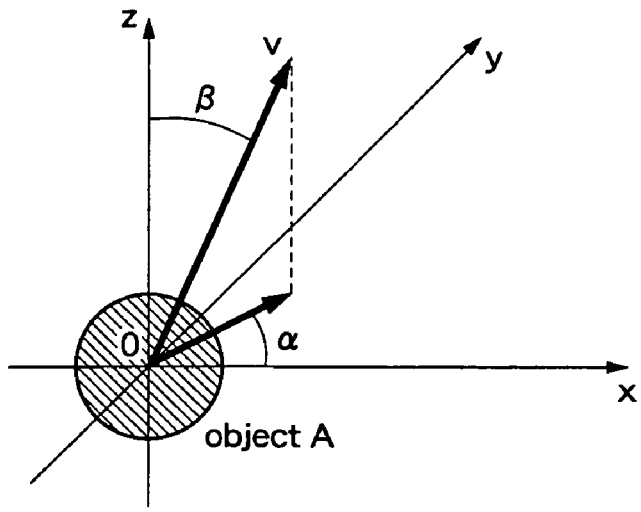
FIG. 11($a$) is a diagram for explaining control of a moving object or a moving part of an object, FIG. 11($b$) is a diagram for explaining control of an object or a part of an object which is constituted by one link, and FIG. 11($c$) is a diagram for explaining control of an object or a part of an object which is constituted by three links.
Figure 11:
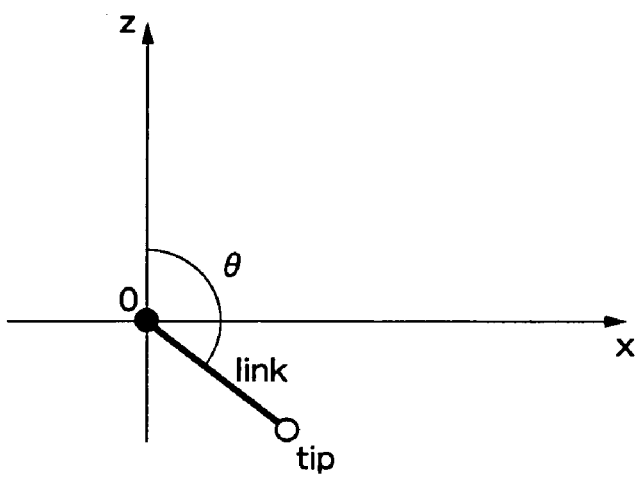
Figure 11:
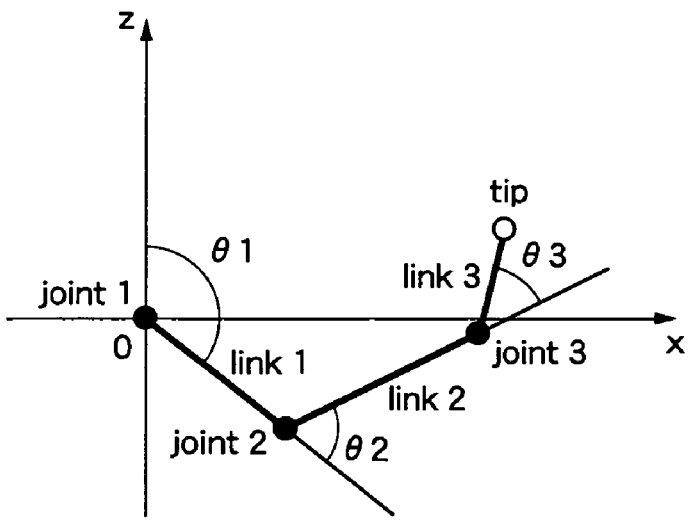

Hereinafter, manual control of an object and parts of an object will be briefly described with reference to FIGS. 11(a)–11(c). FIG. 11(a) is a diagram for explaining manual control of an object. The motion of an object is describable by, for example, Newton's equation of motion. Therefore, when manually controlling the motion of an object, its position at each time, or the velocity and moving direction of the object, or the velocity and acceleration and external force, are given. In this third embodiment, the velocity and moving direction of the object are considered. The moving direction of the object is given as a vector component in a 3-dimensional space, or the component is transformed to polar coordinates. In FIG. 11(a), the moving direction is given by two components of polar coordinates ($\alpha$, $\beta$) and a motion per unit time is given by a velocity v. In this case, assuming that the position of the object after $\Delta t$ is given by (x',y',z') and the present position is given by (x,y,z), the following relationship holds.

$$x'=x+v \sin \beta \cos \alpha \times \Delta t \quad y'=y+v \sin \beta \sin \alpha \times \Delta t \quad z'=z+v \cos \beta \times \Delta t$$

Next, control of parts of an object will be described with respect to a rotation of one link shown in FIG. 11(b), and rotations of three links shown in FIG. 11(c). To be specific, FIG. 11(b) shows the case where an object is composed of a body and an arm corresponding to one link. When a local coordinate system shown in FIG. 11(b) is defined for the object's body, a tip (an end) of the link can be described by a joint angle $\theta$ That is, assuming that the length of the link is L and the position of the tip is given by coordinates (x,y) on the local coordinate system, the following relationship holds.

$$x=L \cos \theta \quad y=L \sin \theta$$

When 3-dimensional CG shape data (surface data, etc.) is ganged with a rotational transform system defined by this link, the shape itself moves. This is the fundamental method of controlling 3-dimensional CG animation which is called skeletal animation.

FIG. 11(c) shows the case where three links exist. When the joint angles of these links are represented by $\theta 1$, $\theta 2$, $\theta 3$, formulae thereof will be complicated and therefore omitted in this third embodiment. However, generally the relationship between the positions of joints or the positions of tips and the joint angles can be described by rotational transform sequences using the joint angles $\theta 1$, $\theta 2$, $\theta 3$. A method of calculating the joint position or the tip position from the joint angle is called "forward kinematics" while a method of calculating the joint angle data from the tip position is called "backward kinematics", and these methods are well known in skeletal animation of CG animation, and robot technology. On the other hand, the relationship between the joint position or the tip position and the joint angle can be expressed at every fixed time, statically, by a potential equation in gravity field. So, under the condition that it is stable when the potential energy is the minimum, if one of the joint position (tip position) and the joint angle is given, the other can be calculated. Further, the relationship can also be expressed dynamically. In this case, the relationship between the torque and the joint angle can be expressed by a Lagrange's equation of motion or a Newton's or Euler's equation of motion. In this case, when the torque at each time is given, the joint angle is calculated by solving the equation of motion. As described above, when 3-dimensional CG shape data is ganged with the rotational transform system which is defined by the link, the shape itself moves. For example, man's arms and legs can be controlled in this way. Even when the number of links increases, the above-described methods can be extended. Although in this third embodiment rotational motion restricted in a two-dimensional plane is described for simplification, the principle is the same even in the case of rotational motion in a three-dimensional space. In this case, a local coordinate system is set for each joint, and the Euler's description method or the Denavit-Hartenberg's description method is employed, whereby the rotational motion can be given as a numerical expression although the expression is complicated.

When having multiple links as described above, the state of a part of an object at each time can be easily calculated by the forward kinematics (because it is describable by a rotational transform sequence) and, therefore, the joint angle is used as motion data in many cases. On the other hand, when controlling arms or legs, since the positions of their tips become active parts in many cases, giving the tip positions makes control easier when considering their effects to the outside. In order to define the state of the part of the object from the tip position, the tip position should be converted to the joint angle (motion data). Accordingly, the tip position is input as control data.

The manual control data input means 72 performs input of control data (or motion data) for manually controlling an object or a part of an object, which is to be moved as the operator desires. Under the existing technology, the manual control data input means 72 is a mouse, a keyboard, a joy stick, a joy pad, a data graph, or a real-time motion capturing system.

When motion data is input by using the manual control data input means 72, conversion of the data by the manual control data conversion means 73 is not necessary. However, when control data is input, the control data should be converted to motion data for calculating the position of an object or the status of a part of the object at each time. The manual control data conversion means 73 performs this conversion.

For example, in the case of FIG. 11(a), it is assumed that the maximum velocity, the minimum velocity, and the range of $\alpha$, $\beta$ are predetermined, and a value is quantized and coded within these ranges. In this case, the code value is received as control data by the manual control data input means 72, and converted to motion data which indicates the position of the actual object at each time, by the manual control data conversion means 73. An example of a conversion method is as follows. A table is prepared in advance, in which code values are entered as arguments, and velocities and $\alpha$, $\beta$ values corresponding to the code values are entered as table values. With reference to the table, a velocity and $\alpha$, $\beta$ values are calculated from the control data (code value) input by the manual control data input means 72. Then, the above-described equation of physical motion is solved by using the calculated values, and a motion from the position at the present time to the next time is added successively, whereby the position of the object at each time (motion data) is obtained.

In the case of FIG. 11(b), the tip position or the joint angle $\theta$ is used as motion data (since the state of the link itself is described). For example, since the tip's movable range is finite in the local coordinate system when the link length is fixed, the finite area is quantized and coded to be stored as an argument of a table, and a tip position corresponding to this argument is stored as a table reference value. A code value is input as control data by the manual control data input means 72, and the manual control data conversion means 73 calculates the tip position by referring to the table, with the input code value as an argument. Further, when the junction angle velocity or the junction angle acceleration is known, the junction angle at each time can be calculated by solving a Newton's equation of motion (in this case, the moment of inertia is given in advance). Therefore, the junction angle velocity or the junction angle acceleration is input by the manual control data input means 72, and the equation of motion is solved by the manual control data conversion means 73 to convert it into junction angle data as motion data. Also in this case, the junction angle velocity or the junction angle acceleration is limited within a finite range, and the range is quantized and coded to perform conversion in the same manner as described for FIG. 11(a).

In the case of FIG. 11(c), the tip position is input as control data, for the reason described above. Like the case of FIG. 11(b), since the tip's movable range is finite in the local coordinate system when the link length is fixed, this finite area is quantized and coded to be stored as an argument of a table, and joint angle data (motion data) in the state of the quantized tip position is calculated from a reference value of the table. The table reference value can be calculated under the condition that the potential energy of the above-described potential equation is the minimum. When control data (code value) is input by using the manual control data input means 72, the manual control data conversion means 73 converts the input code value to a junction angle with reference to the table. Alternatively, representative positions within the tip's movable range may be used as table arguments, and the junction angles at the positions may be stored as table reference values. In this case, the manual control data input means 72 inputs the tip position as control data, and an argument in the vicinity of this input value is obtained, and the table reference value corresponding to this argument is subjected to bilinear interpolation utilizing the relationship between the input value and the argument, or surface interpolation using spline function, thereby calculating a joint angle corresponding to the input value. Further, without using the table, a neural network may learn calculation of the junction angles corresponding to the representative positions. In this case, when the control data from the manual control data input means 72 is input to the neural network, a junction angle is obtained as an output. Generally, a neural network with three-layer back propagation comprising an input layer, an intermediate layer, and an output layer, is utilized.

On the other hand, since the table reference value or the value learned by the neural network is obtained by solving a physical equation, it is also possible to calculate a junction angle by solving the physical equation directly from the tip position input by the manual control data input means 72. Further, when the tip velocity can be calculated from the input or control data, a junction angle can be obtained by solving backward inverse kinematics. However, when performing conversion by directly solving a physical equation, the balance with the calculation time should be considered.

The motion control data output means 74 outputs, as scene generation motion data, the motion data supplied from the manual control data conversion means 73, for an object or a part of an object to be manually controlled, and outputs the motion stream data transmitted from the stream data receiving means 71, for the other objects or parts. In this case, amongst the objects or parts to be motion-controlled, those to be manually controlled are fixed or given identifiers.

The scene data generation means 75 generates scene data from the scene generation motion data at each frame time, which is output from the motion control data output means 74, and from other data required for scene configuration (e.g., 3-dimensional shape data, camera data, texture data, luminous data, data for bump mapping, data for illuminance mapping, etc.) which are externally supplied. The scene generation motion data is motion data which is time series data by which the position of a moving object or the status of a skeletal structure at each time can be calculated. A transform sequence or the like is obtained from the motion data, and a 3-dimensional shape which defines the control object is transformed to the status of the 3-dimensional shape at each time (e.g., the positions of apexes of polygons constituting the 3-dimensional shape). Scene data is obtained by adding, to the motion data, other CG data indicating the shapes of objects other than the target object, the status of camera, the texture mapping method, and the state of light source. That is, scene data is data required for generating a 3-dimensional CG image at each time.

The drawing means 76 generates a 3-dimensional CG image from the scene data output from the scene data generation means 75. As a 3-dimensional CG image generation method, Phong shading or Gouraud shading, which are generally known as luminance calculation methods, is used. As a hidden surface removal method, Z buffering or scan line buffering is used. Further, when using texture mapping, bump mapping, illuminance mapping, or shadow mapping, the reality is increased and thereby the image definition is improved. The image data of the 3-dimensional CG image generated by the drawing means 76 is displayed by the display means 77. A 3-dimensional CG drawing board on the market can be used as the drawing means 76, and a CRT or a liquid crystal display can be used as the display means 77.

The respective processes according to this fourth embodiment are performed in synchronization with each other. Especially, performing synchronization processing in the motion control data output means 74 is effective for pipelining the processes from generation of scene data to display of image data.

As described above, the virtual space control data receiving apparatus according to the fourth embodiment is provided with the stream data receiving means for receiving stream data and outputting motion stream data and other stream data; the manual control data input means by which motion data corresponding to an object or a part of an object to be motion-controlled is manually input; and the motion control data output means for outputting, as scene generation motion data, the motion data supplied from the manual control data input means, for the object or part to be controlled by the motion data input by the manual control data input means, and outputting the motion stream data supplied from the stream data receiving means, for the other objects or parts. Therefore, in a dynamic virtual space represented by 3-dimensional CG, static image, dynamic image, audio and text which are based on a network such as the Internet, the viewer can move an object or a part of an object under control, as he/she desires.

Further, the virtual space control data receiving apparatus of the fourth embodiment is provided with the manual control data conversion means for converting the control data which is input by the manual control data input means into motion data adapted to an object or a part of an object to be controlled. The motion control data output means outputs, as scene generation motion data, the motion data supplied from the manual control data conversion means, for an object or a part of an object to be controlled by the control data which is input by the manual control data input means, and outputs the motion stream data supplied from the stream data receiving means, for the other objects or parts. Therefore, in a dynamic virtual space represented by 3-dimensional CG, static image, dynamic image, audio and text which are based on a network such as the Internet, the viewer can move all of objects or parts of objects under control, by the same control data.

Further, in the virtual space control data receiving apparatus of the fourth embodiment, the motion control data output means outputs the scene generation motion data for an object or a part of an object to be controlled by the data which is input by the manual control data input means, in synchronization with the scene generation motion data for the other objects or parts. Therefore, the motion of an object or a part of an object under control of the viewer can be reproduced in accordance with a dynamic virtual space represented by 3-dimensional CG, static image, dynamic image, audio and text which are based on a network such as the Internet.

Further, in the virtual space control data receiving apparatus of the fourth embodiment, tabled conversion data are used when the manual control data conversion means converts the inputted control data to motion data of an object or a part of an object, whereby conversion of the control data to the motion data is facilitated.

Further, in the virtual space control data receiving apparatus of the fourth embodiment, tabled key transformation data are interpolated when the manual control data conversion means converts the inputted control data to motion data of an object or a part of the object, whereby conversion of the control data to the motion data is facilitated.

Further, in the virtual space control data receiving apparatus of the fourth embodiment, a neural network which has learned in advance is used when the manual control data conversion means converts the inputted control data to motion data of an object or a part of an object, whereby conversion of the control data to the motion data is facilitated.

Further, in the virtual space control data receiving apparatus of the fourth embodiment, physical calculation for expressing physical characteristics of a selected object or part is used when the manual control data conversion means converts the inputted control data to motion data of the object or part, whereby conversion of the control data to the motion data is facilitated.

Further, the virtual space control data receiving apparatus of the fourth embodiment is provided with the scene generation means for generating scene data from the scene generation motion data output from the motion control data output means and other CG data required for generating a scene; the drawing means for generating an image from the scene data generated by the scene generation means; and the display means for displaying the image generated by the drawing means. Therefore, a dynamic virtual space can be represented on the basis of data such as 3-dimensional CG, static image, dynamic image, audio and text which are based on a network such as the Internet.

Embodiment 5

Figure 6:
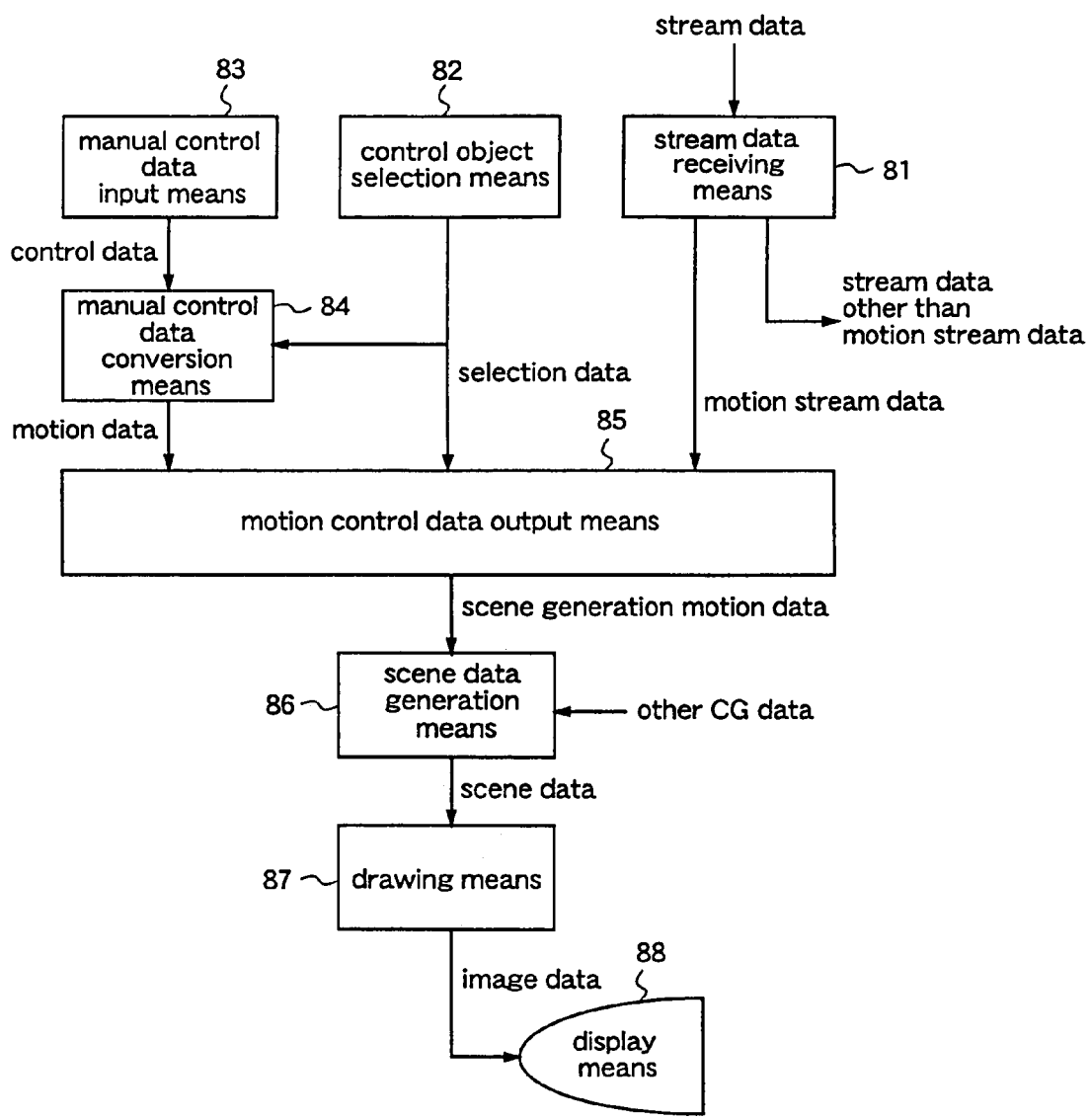
FIG. 6 is a block diagram illustrating a virtual space control data receiving apparatus according to a fifth embodiment of the present invention.

FIG. 6 is a block diagram illustrating the structure of a virtual space control data receiving apparatus according to a fifth embodiment of the present invention. The virtual space control data receiving apparatus comprises a stream data receiving means 81, a control object selection means 82, a manual control data input means 83, a manual control data conversion means 84, a motion control data output means 85, a scene data generation means 86, a drawing means 87, and a display means 88.

The stream data receiving means 81, the scene data generation means 86, the drawing means 87, and the display means 88 are identical to the stream data receiving means 71, the scene data generation means 75, the drawing means 76, and the display means 77 according to the fourth embodiment.

Hereinafter, the respective constituents of the apparatus will be described in detail.

Figure 12:
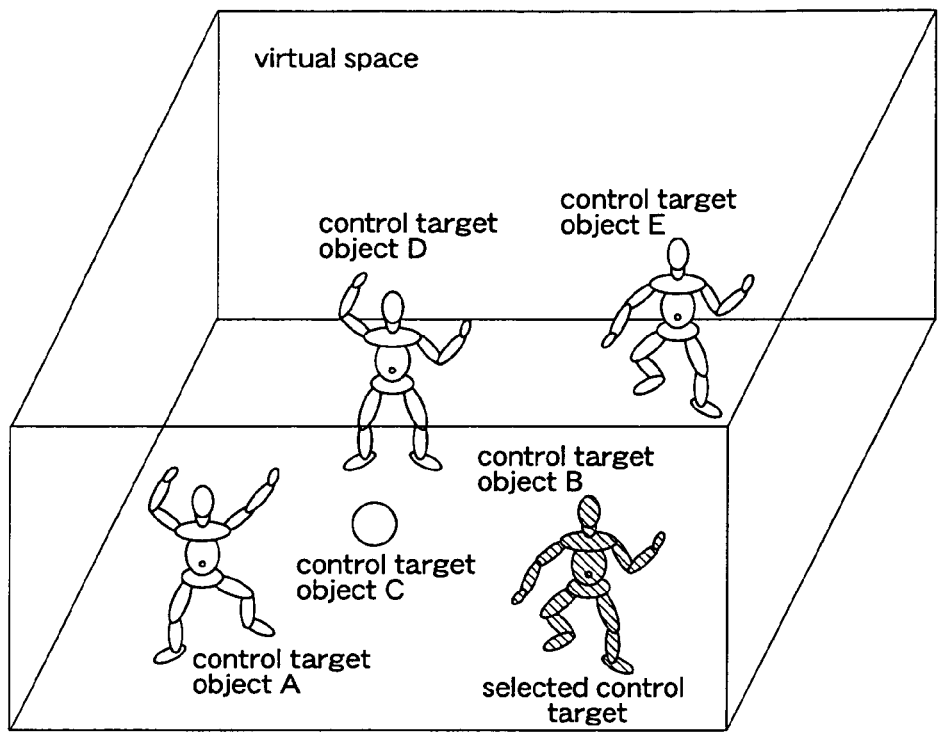
FIG. 12($a$) is a diagram for explaining selection of an object, and FIG. 12($b$) is a diagram for explaining selection of a part of an object.
Figure 12:
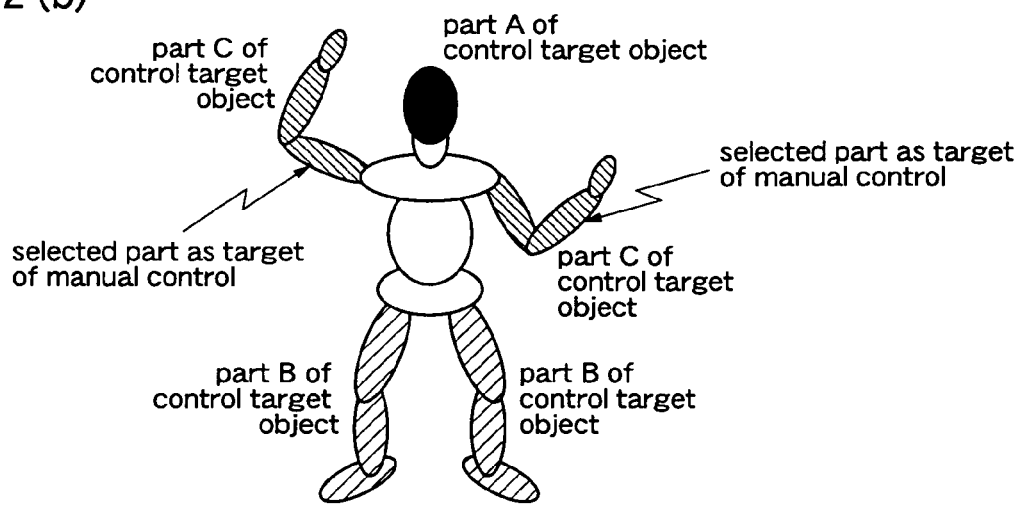

When there are plural objects A~E to be controlled (control targets) in a virtual space as shown in FIG. 12(a), the control object selection means 82 selects, for example, an object B from the plural objects, or a part C of an object to be controlled as shown in FIG. 12(b). This selection is realized by giving identifiers to objects and parts to be controlled, and specifying one of these identifiers. The specified identifier is transmitted as selection data to the manual control data conversion means 84 or the motion control data output means 85. As alternative selection method, an identifier itself may be input, or an object or a part may be selected directly from an image as shown in FIG. 12(a) or 12(b). However, in order to realize the selection from the image, the apparatus should be provided with the functions of identifying an area of each control object on the image, specifying an area, identifying a control object from the specified area, and calculating an identifier from the identified control object. These functions are realized by using a method of window management which is generally performed in computers.

Figure 14:
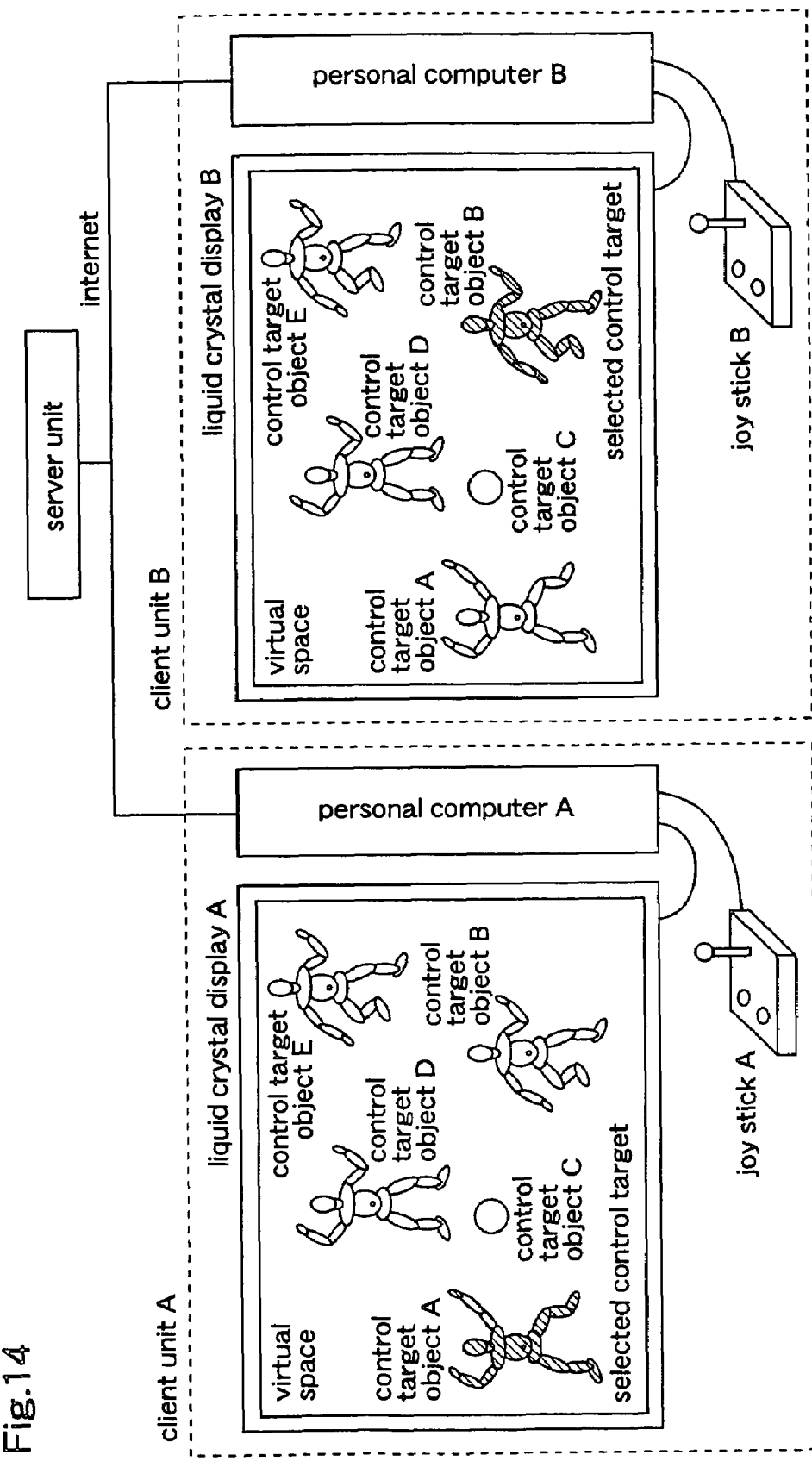
FIG. 14 is a diagram for explaining a game utilizing the Internet.

FIG. 14 illustrates the case where virtual space control data receiving apparatuses according to this fifth embodiment are used as game machines utilizing the Internet. A server unit (stream data transmission means) is connected with two client units (virtual space control data receiving apparatuses) A and B through the Internet (data transmission/reception line), and stream data comprising motion data of five objects is transmitted to the client units A and B. The client units A and B display images based on the stream data on liquid crystal displays (display means) A and B when no control data is input from joy sticks (manual control data input means) A and B, respectively. When control data is input, the client units display images based on the inputted control data. A match game utilizing the Internet is played as follows. Assuming that initially selected objects are controlled thereafter, one player controls the object A by using the joy stick A of the client unit A while the other player controls an object B by using the joy stick B of the client unit B. The motion of the object A controlled by the joy stick A is displayed on the liquid crystal display A and, simultaneously, it is displayed on the liquid crystal display B. The motion of the object B controlled by the joy stick B is displayed in like manner. In this way, the virtual space control data receiving apparatuses can be used as game machines.

The manual control data input means 83 is identical to the manual control data input mans 72 according to the fourth embodiment. However, when plural control objects are controlled by different control data (or motion data), the operator inputs control data (or motion data) according to the control object selected by the control object selection means 82, in accordance with a predetermined rule.

The manual control data conversion means 84 converts the control data input by the manual control data input means 83 to motion data according to the control object selected by the control object selection means 82. However, when motion data itself is input by the manual control data input means 83, the conversion is not necessary. A table having selection data output from the control object selection means 82 as arguments and conversion methods as table values, is prepared in advance. A conversion method is determined with reference to the table, and the control data is converted to the motion data by the determined conversion method, in like manner as described for the manual control data conversion means 73 of the fourth embodiment.

The motion control data output means 85 determines an object or a part of an object to be controlled manually (control target), according to the selection data output from the control object selection means 82. Then, the motion control data output means 85 outputs the motion data supplied from the manual control data conversion means 84, as scene generation motion data, for the determined control object, and outputs the motion stream data transmitted from the stream data receiving means 81, as scene generation motion data, for the other control objects.

As described above, a virtual space control data receiving apparatus according to the fifth embodiment is provided with the control object selection means for inputting selection data for selecting an object or a part of an object to be controlled manually. The manual control data input means inputs motion data corresponding to the object or part selected by the control object selection means. The motion control data output means outputs the motion data supplied from the manual control data input means, as scene generation motion data, for the selected object or part, and outputs the motion stream data supplied from the stream data receiving means, as scene generation motion data, for the other objects and parts. Therefore, in a dynamic virtual space represented by 3-dimensional CG, static image, dynamic image, audio and text which are based on a network such as the Internet, the operator is able to arbitrarily select an object or a part of an object to be controlled, and move the selected object as he/she desires.

Embodiment 6

Figure 7:
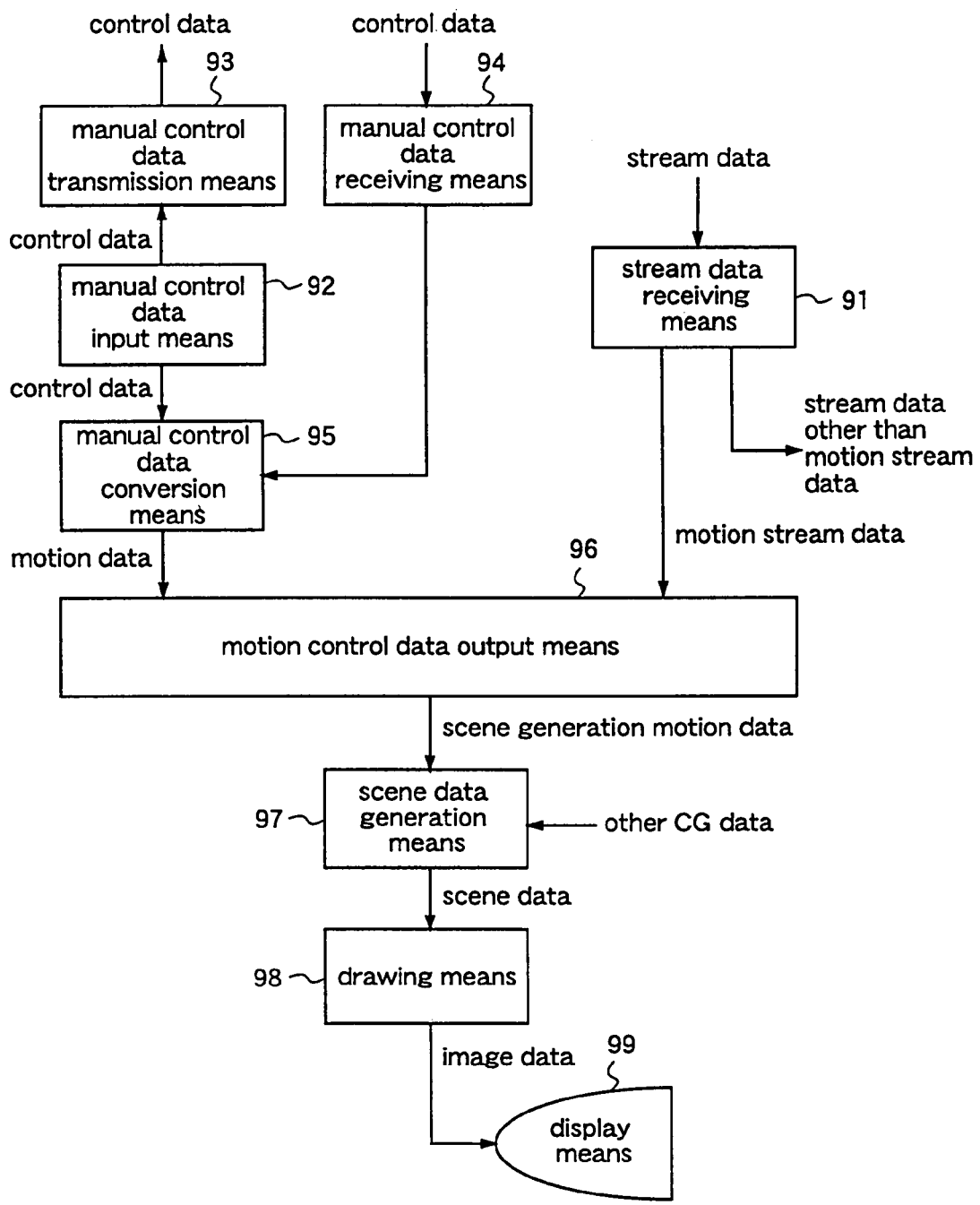
FIG. 7 is a block diagram illustrating a virtual space control data receiving apparatus according to a sixth embodiment of the present invention.

FIG. 7 is a block diagram illustrating the structure of a virtual space control data receiving apparatus according to a sixth embodiment of the present invention. The virtual space control data receiving apparatus comprises a stream data receiving means 91, a manual control data input means 92, a manual control data transmission means 93, a manual control data receiving means 94, a manual control data conversion means 95, a motion control data output means 96, a scene data generation means 97, a drawing means 98, and a display means 99.

The stream data receiving means 91, the scene data generation means 97, the drawing means 98, and the display means 99 are identical to the stream data receiving means 71, the scene data generation means 75, the drawing means 76, and the display means 77 according to the fourth embodiment.

Hereinafter, the respective constituents of the apparatus will be described in detail.

The manual control data input means 92 is used for inputting control data or motion data like the manual control data input means 72 of the fourth embodiment, and sends the inputted control data or motion data to the manual control data transmission means 93 and the manual control data conversion means 95.

The manual control data transmission means 93 transmits the control data or motion data from the manual control data input means 92 to an external virtual space control data receiving apparatus which has the same structure as that of this sixth embodiment. On the other hand, the manual control data receiving means 94 receives control data or motion data transmitted from the external virtual space control data receiving apparatus, and outputs it to the manual control data conversion means 95.

Hereinafter, the method of transmitting and receiving control data will be described by using FIGS. 13(*a*) and 13(*b*). FIG. 13(*a*) shows the format of a control data packet corresponding to one block, and transmission and reception of control data are performed using this packet. The header section of the control data packet comprises client identifiers given to a plurality of virtual space control data receiving apparatuses, a packet identifier indicating that this packet is a control data packet, a time stamp indicating a time from a reference point of time at which this packet was generated, and the total number of channels (Dc) to be transmitted. The data section comprises, for one channel, a channel identifier indicating a channel number, and compressed or non-compressed data (data to be transmitted) equivalent to the packet size. That is, the data section comprises the channel identifiers and the data to be transmitted as many as the number of channels (Dc). As shown in FIG. 13(*b*), the control data is transmitted or received packet by packet.

The manual control data conversion means 95 converts the control data transmitted from the manual control data input means 92 or the manual control data receiving means 94 into motion data as described for the fourth embodiment, and outputs the motion data to the motion control data output means 96. However, when motion data is transmitted from the manual control data input means 92 or the manual control data receiving means 94, this conversion is not necessary.

The motion control data output means 96 outputs, as scene generation motion data, the motion data output from the manual control data conversion means 95, for an object or a part of an object to be controlled by the control data (or motion data) output from the manual control data input means 92, or an object or a part of an object to be controlled by the control data (or motion data) output from the manual control data receiving means 94. Further, the motion control data output means 96 outputs, as scene generation motion data, the motion stream data transmitted from the stream data receiving means 91, for the other control objects. In this case, amongst the objects and parts of the objects to be motion-controlled, those to be manually controlled are fixed or given identifiers.

As described above, the virtual space control data receiving apparatus according to this sixth embodiment is provided with the manual control data transmission means for transmitting the control data for the control object (an object or a part of an object) which is input by the manual control data input means, to the external apparatus, and the manual control data receiving means for receiving the control data for the control object (an object or a part of an object) which is transmitted from the external apparatus. The motion control data output means outputs, as scene generation motion data, the motion data output from the manual control data conversion means, for an object or a part of an object to be controlled by the control data output from the manual control data input means, or an object or a part of an object to be controlled by the control data output from the manual control data receiving means. For the other control objects, the motion control data output means outputs, as scene generation motion data, the motion stream data output from the stream data receiving means. Therefore, in a dynamic virtual space represented by 3-dimensional CG, static image, dynamic image, audio and text which are based on a network such as the Internet, the motion of an object controlled by another virtual space control data receiving apparatus can be reproduced.

Further, in the virtual space control data receiving apparatus according to this sixth embodiment, the motion control data output means outputs the scene generation motion data for an object or a part of an object to be controlled with the data input by the manual control data input means or the scene generation motion data for an object or a part of an object to be controlled with the data received by the manual control data receiving means, in synchronization with the scene generation output data for the other objects or parts. Therefore, the motion of an object or a part of an object under control of another virtual space control data receiving apparatus and the motion of an object or a part of an object under control of the operator, can be reproduced in accordance with a dynamic virtual space represented by 3-dimensional CG, static image, dynamic image, audio, and text which are based on a network such as the Internet.

Embodiment 7

Figure 8:
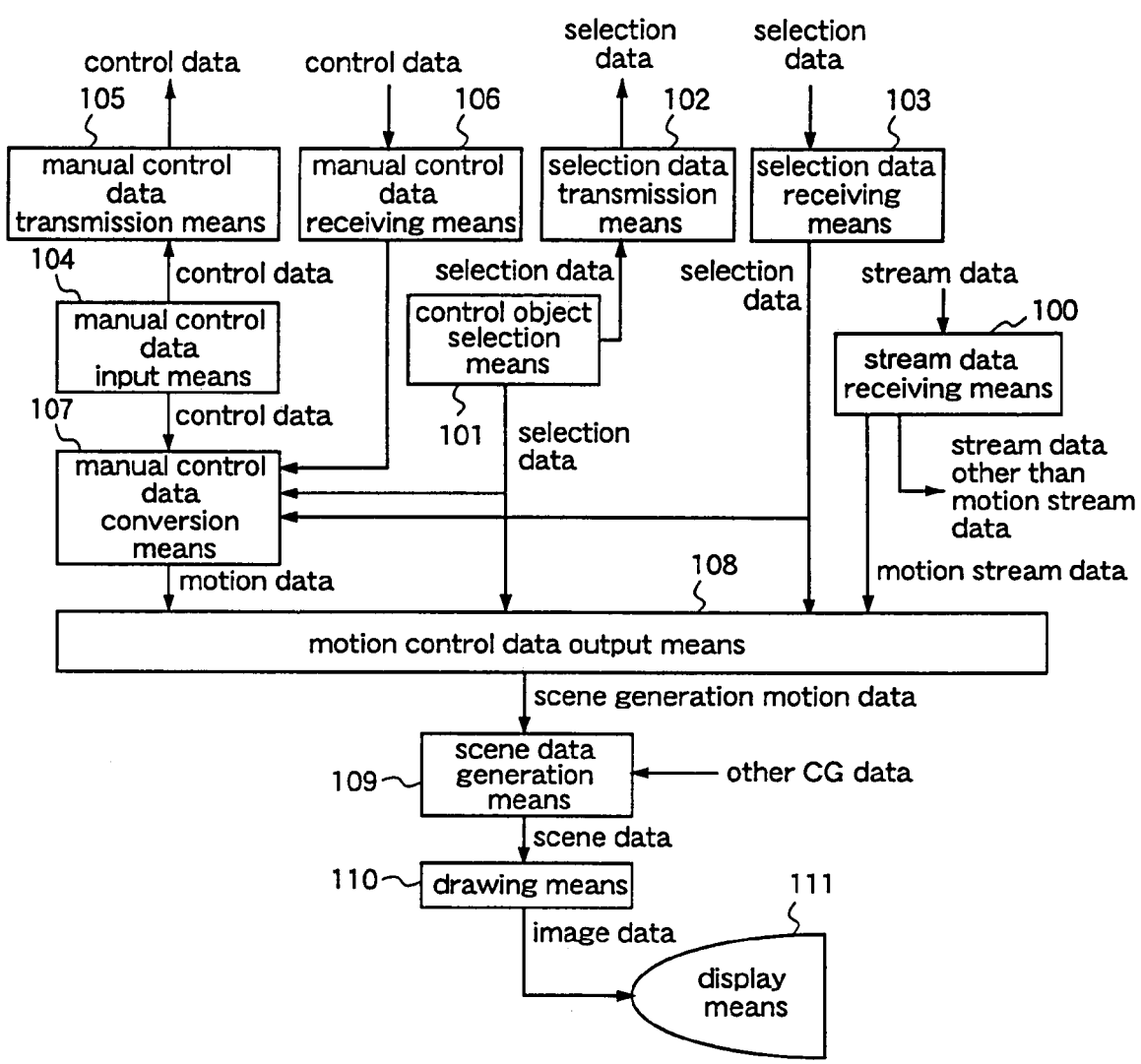
FIG. 8 is a block diagram illustrating a virtual space control data receiving apparatus according to a seventh embodiment of the present invention.

FIG. 8 is a block diagram illustrating the structure of a virtual space control data receiving apparatus according to a seventh embodiment of the present invention. The virtual space control data receiving apparatus comprises a stream data receiving means 100, a control object selection means 101, a selection data transmission means 102, a selection data receiving means 103, a manual control data input means 104, a manual control data transmission means 105, a manual control data receiving means 106, a manual control data conversion means 107, a motion control data output means 108, a scene data generation means 109, a drawing means 110, and a display means 111.

The stream data receiving means 100, the scene data generation means 109, the drawing means 110, and the display means 111 are identical to the stream data receiving means 71, the scene data generation means 75, the drawing means 76, and the display means 77 according to the fourth embodiment.

Hereinafter, the respective constituents of the apparatus will be described in detail.

The control object selection means 101 inputs selection data for an object or a part of an object to be manually controlled, as described for the fifth embodiment. The inputted selection data is transmitted to the selection data transmission means 102, the manual control data conversion means 107, and the motion control data output means 108.

The selection data transmission means 102 transmits the selection data supplied from the control object selection means 101, to an external virtual space control data receiving apparatus which has the same structure as that of this seventh embodiment. On the other hand, the selection data receiving means 103 receives selection data transmitted from the external virtual space control data receiving apparatus, and outputs it to the manual control data conversion means 107 and the motion control data conversion means 108.

The manual control data input means 104 is used for inputting control data or motion data like the manual control data input means 92 of the sixth embodiment, and sends the inputted control data or motion data to the manual control data transmission means 105 and the manual control data conversion means 107.

The manual control data transmission means 105 transmits the control data or motion data supplied from the manual control data input means 104, to an external virtual space control data receiving apparatus which has the same structure as that of this seventh embodiment. On the other hand, the manual control data receiving means 106 receives control data or motion data transmitted from the external virtual space control data receiving apparatus, and outputs it to the manual control data conversion means 107.

Hereinafter, the method of transmitting and receiving the selection data and the control data will be described by using FIGS. 13(a)–13(d). Since the format of the control data packet is identical to that described for the sixth embodiment, only the format of the selection data packet will be described. The selection data packet is composed of a header section and a data section. The header section comprises client identifiers given to a plurality of virtual space control data receiving apparatuses, a packet identifier indicating that this packet is a selection data packet, a control object identifier for specifying a control object, a time stamp indicating a time from a reference point of time at which this packet was generated, the total number of channels (Tc) to be transmitted by this packet (Dc≦Tc), a compression method identifier indicating a compression method for the control data to be transmitted (when there are plural compression methods, a method is defined for each channel), and a packet size indicating the size of this packet. The data section comprises, for one channel, a channel identifier indicating the channel number, a data size indicating the size of data of this channel, a channel type indicating the type of data of this channel (vector type data, scalar type data, etc.), and a channel name indicating the name of data of this channel. That is, the data section comprises these entries as many as the number of channels (Tc). As shown in FIG. 13(c), initially a selection data packet is transmitted and, subsequently, control data packets are transmitted. When the control object is changed, a selection data packet corresponding to the new control object is transmitted, followed by control data packets for this control object.

The manual control data conversion means 107 converts the control data transmitted from the manual control data input means 104 or the manual control data receiving means 106, into motion data of the control object specified by the selection data transmitted from the control object selection means 101 or the selection data receiving means 103, and outputs it to the motion control data output means 108. When motion data is transmitted from the manual control data input means 104 or the manual control data receiving means 106, this conversion is not necessary.

The motion control data output means 108 outputs, as scene generation motion data, the motion data output from the manual control data conversion means 107, for the control object specified by the selection data transmitted from the control object selection means 101 or the control object specified by the selection data transmitted from the selection data receiving means 103. For the other control objects, the motion control data output means 108 outputs, as scene generation motion data, the motion stream data transmitted from the stream data receiving means 100.

The respective processes described for the fourth, fifth, —sixth and seventh embodiments can be realized by software on a computer.

As described above, the virtual space control data receiving apparatus according to this seventh embodiment is provided with the selection data transmission means for transmitting the selection data input by the control object selection means, to the external apparatus, and the selection data receiving means for receiving the selection data transmitted from the external apparatus. The motion control data output means outputs, as scene generation motion data, the motion data output from the manual control data conversion means, for an object or a part of an object which is selected by the selection data from the control object selection means or the selection data receiving means. For the other objets and parts, the motion control data output means outputs, as scene generation motion data, the motion stream data output from the stream data receiving means. Therefore, in a dynamic virtual space represented by 3-dimensional CG, static image, dynamic image, audio and text which are based on a network such as the Internet, the motion of an object selected and controlled by another virtual space control data receiving apparatus can be reproduced.

What is claimed is:

1. A stream correction apparatus for receiving an input stream in which motion data of plural components constructing computer graphics are packetized with time information in time sequence, and for correcting a part of the input stream, said apparatus comprising:

a user interface unit operable to select a component to be operated by a user from among the plural components and to input operational contents of the selected component; and a correction unit operable to generate motion data for the selected component with data based on the operational contents inputted by said user interface unit, operable to save the generated motion data in an overwriting buffer in said correction unit, operable to generate a synchronized stream by synchronizing the input stream with the generated motion data in the overwriting buffer, and operable to output the synchronized stream as a corrected stream, wherein the plural components include parts of an object to be operated, the motion data includes a joint angle of the parts, and said correction unit is further operable to correct the joint angle.

2. The stream correction apparatus of claim 1 further comprising a stream data reception unit operable to receive the input stream, wherein said correction unit is further operable to correct the input stream by replacing the motion data of the selected component with data based on the operational contents before outputting the corrected stream.

3. The stream correction apparatus of claim 2 further comprising a data conversion unit operable to convert the operational contents into second data suited to the motion data of the selected component and to output the second data, wherein said correction unit is further operable to correct the input stream by replacing the motion data of the selected component with the second data before outputting the corrected stream.

4. A computer graphics reproduction apparatus for reproducing computer graphics from data of the corrected stream of claim 2, said apparatus comprising a reproduction unit operable to decode the corrected stream, which is outputted from the correction unit, to reproduce the computer graphics.

5. A computer graphics display apparatus of claim 2, further comprising a display unit operable to real time display the computer graphics reproduced by said reproduction unit.

6. The stream correction apparatus of claim 1 further comprising:

a user data transmission unit operable to transmit the selected component and the operational contents of the selected component to a second stream correction apparatus; and a user data reception unit operable to receive a second component selected by a second user interface unit of the second stream correction apparatus and second operational contents of the second selected component, wherein said correction unit is further operable to correct the input stream by replacing the motion data of the selected component with data based on the operational contents and replacing motion data of the second selected component with data based on the second operational contents before outputting the corrected stream.

7. A stream correction apparatus for receiving an input stream in which motion data of plural components constructing computer graphics are packetized with time information in time sequence, and for correcting a part of the input stream, said apparatus comprising:

a user interface unit operable to select an object or an object part to be operated by a user from among the plural components and to input operational contents of the selected object or object part; and a correction unit operable to generate motion data for the selected object or object part with data based on the operational contents inputted by said user interface unit, operable to save the generated motion data in an overwriting buffer in said correction unit, operable to generate a synchronized stream by synchronizing the input stream with the generated motion data in the overwriting buffer and operable to output the synchronized stream as a corrected stream, wherein the components include parts of an object to be operated, the motion data includes a joint angle of the parts, and said correction unit is further operable to correct the joint angle.

8. The stream correction apparatus of claim 7 further comprising a data conversion unit operable to convert the operational contents into second data suited to the motion data of the selected object or object part and to output the second data, wherein said correction unit is further operable to correct the input stream by replacing the motion data of the selected object or object part with the second data before outputting the corrected stream.

9. The stream correction apparatus of claim 7, further comprising a data conversion unit operable to convert the operational contents into second data suited to the motion data of the selected object or object part and to output the second data and to use tabled conversion data when converting the operational contents into data suited to the motion data of the selected object or object part.

10. The stream correction apparatus of claim 7, further comprising a data conversion unit operable to convert the operational contents into second data suited to the motion data of the selected object or object part and to output the second data and to use tabled key conversion data when converting the operational contents into data suited to the motion data of the selected object or object part.

11. The stream correction apparatus of claim 7, further comprising a data conversion unit operable to convert the operational contents into second data suited to the motion data of the selected object or object part and to output the second data and to use a pre-taught neural network when converting the operational contents into data suited to the motion data of the selected object or object part.

12. A computer graphics reproduction apparatus for reproducing computer graphics from data of the corrected stream of claim 7, said apparatus comprising a reproduction unit operable to decode the corrected stream, which is outputted from the correction unit, to reproduce the computer graphics.

13. A computer graphics display apparatus of claim 12, further comprising a display unit operable to real time display the computer graphics reproduced by said reproduction unit.

14. A transmission and reception system comprising:
a stream transmission apparatus for transmitting a first stream in which motion data of plural components constructing computer graphics are packetized with time information in time sequence; and
a stream correction apparatus for correcting a part of the first stream, said stream correction apparatus comprising a user interface unit and a correction unit,
wherein said user interface unit is operable to select a component to be operated by a user from among the plural components and to input operational contents of the selected component,
wherein said correction unit is operable to generate motion data for the selected component with data based on the operational contents inputted by said user interface unit, is operable to save the generated motion data in an overwriting buffer in said correction unit, is operable to generate a synchronized stream by synchronizing the first stream with the generated motion data in the overwriting buffer, and is operable to output the synchronized stream as a corrected stream, and
wherein the components include parts of an object to be operated, the motion data includes a joint angle of the parts, and said correction unit is further operable to correct the joint angle.

15. A stream correction method for receiving a stream in which motion data of plural components constructing computer graphics are packetized with time information in time sequence, and correcting a part of the stream, said method comprising:
selecting a component to be operated by a user from among the plural components;
inputting operational contents of the selected component;
correcting the stream by generating motion data for the selected component with data based on the inputted operational contents;
saving the generated motion data in an overwriting buffer;
generating a synchronized stream by synchronizing the stream with the generated motion data in the overwriting buffer; and
outputting the synchronized stream as a corrected input stream,
wherein the components include parts of an object to be operated, the motion data includes a joint angle of the parts, and said correcting further corrects the joint angle.

16. A computer graphics reproduction method for receiving a stream in which motion data of plural components constructing computer graphics are packetized with time information in time sequence, and reproducing the computer graphics in which a part of the stream is corrected, said method comprising:
selecting a component to be operated by a user from among the plural components;
inputting operational contents of the selected component;
correcting the stream by generating motion data for the selected component with data based on the inputted operational contents;
saving the generated motion data in an overwriting buffer:
generating a synchronized stream by synchronizing the stream with the generated motion data in the overwriting buffer:
outputting the synchronized stream as a corrected input stream; and
reproducing the computer graphics by decoding the outputted corrected input stream,
wherein the components include parts of an object to be operated, the motion data includes a joint angle of the parts, and said correcting further corrects the joint angle.

17. A computer graphics display method for receiving a stream in which motion data of plural component constructing computer graphics are packetized with time information in time sequence, reproducing the computer graphics in which a part of the stream is corrected, and displaying the computer graphics, said method comprising:
selecting a component to be operated by a user from among the plural components;
inputting operational contents of the selected component;
correcting the stream by generating motion data for the selected component with data based on the inputted operational contents;
saving the generated motion data in an overwriting buffer;
generating a synchronized stream by synchronizing the stream with the generated motion data in the overwriting buffer; and
outputting the synchronized stream as a corrected input stream;
reproducing the computer graphics by decoding the outputted corrected input stream; and
displaying, in real time, the reproduced computer graphics,
wherein the components include parts of an object to be operated, the motion data includes a joint angle of the parts, and said correcting further corrects the joint angle.

18. A data storage medium having computer readable instructions stored thereon, the computer readable instructions being capable of instructing a computer to perform a stream correction process of receiving a stream in which motion data of plural components constituting computer graphics are packetized with time information in time sequence and to correct a part of the stream, the computer readable instructions comprising instructions capable of instructing a computer to:
select a component to be operated by a user from among the plural components;
input operational contents of the selected component;
correct the stream by generating motion data for the selected component with data based on the inputted operational contents;
save the generated motion data in an overwriting buffer:
generate a synchronized stream by synchronizing the stream with the generated motion data in the overwriting buffer; and
output the synchronized stream as a corrected input stream,
wherein the components include parts of an object to be operated, the motion data includes a joint angle of the parts, and said correcting further corrects the joint angle.

19. A data storage medium having computer readable instructions stored thereon, the computer readable instructions being capable of instructing a computer to perform a computer graphics reproduction process of receiving a stream in which motion data of plural components constituting computer graphics are packetized with time information in time sequence and to reproduce the computer graphics in which a part of the stream is corrected, the computer readable instructions comprising instructions capable of instructing a computer to:

select a component to be operated by a user from among the plural components;

input operational contents of the selected component;

correct the stream by generating motion data for the selected component with data based on the inputted operational contents;

save the generated motion data in an overwriting buffer;

generate a synchronized stream by synchronizing the stream with the generated motion data in the overwriting buffer; and output the synchronized stream as a corrected input stream; and reproduce the computer graphics by decoding the outputted corrected input stream, wherein the components include parts of an object to be operated, the motion data includes a joint angle of the parts, and said correcting further corrects the joint angle.

20. A data storage medium having computer readable instructions stored thereon, the computer readable instructions being capable of instructing a computer to perform a computer graphics display process of receiving a stream in which motion data of plural components constituting computer graphics are packetized with time information in time sequence, to reproduce the computer graphics in which a part of the stream is corrected and to display the computer graphics, the computer readable instructions comprising instructions capable of instructing a computer to:

select a component to be operated by a user from among the plural components;

input operational contents of the selected component;

correct the stream by generating motion data for the selected component with data based on the inputted operational contents;

save the generated motion data in an overwriting buffer;

generate a synchronized stream by synchronizing the stream with the generated motion data in the overwriting buffer; and output the synchronized stream as a corrected input stream;

reproduce the computer graphics by decoding the outputted corrected input stream; and display, in real time, the reproduced computer graphics, wherein the components include parts of an object to be operated, the motion data includes a joint angle of the parts, and said correcting further corrects the joint angle.

\* \* \* \* \*

UNITED STATES PATENT AND TRADEMARK OFFICE
CERTIFICATE OF CORRECTION

PATENT NO. : 6,961,060 B1
DATED : November 1, 2005
INVENTOR(S) : Yoshiyuki Mochizuki et al.

It is certified that error appears in the above-identified patent and that said Letters Patent is hereby corrected as shown below:

<u>Title page,</u>
Item [56], References Cited, OTHER PUBLICATIONS, "Naka et al." reference, "63-70" should read -- pp. 63-70 --.

<u>Column 32,</u>
Line 24, "buffer and" should read -- buffer, and --.

<u>Column 33,</u>
Lines 64 and 66, "in an overwriting buffer:" should read -- in an overwriting buffer; --.

<u>Column 34,</u>
Line 50, "in an overwriting buffer:" should read -- in an overwriting buffer; --.

Signed and Sealed this

Twenty-eighth Day of March, 2006

JON W. DUDAS
*Director of the United States Patent and Trademark Office*